US012409933B2

(12) United States Patent
Kubie et al.

(10) Patent No.: US 12,409,933 B2
(45) Date of Patent: Sep. 9, 2025

(54) BACKEND AUTOMATION SYSTEM FOR SIMULATION OF DRONE DELIVERIES THROUGH VIRTUAL FLEETS

(71) Applicant: Wing Aviation LLC, Palo Alto, CA (US)

(72) Inventors: Martin Kubie, San Francisco, CA (US); Devan Dutta, Mountain View, CA (US)

(73) Assignee: Wing Aviation LLC, Palo Alto, CA (US)

( * ) Notice: Subject to any disclaimer, the term of this patent is extended or adjusted under 35 U.S.C. 154(b) by 150 days.

(21) Appl. No.: 17/932,920

(22) Filed: Sep. 16, 2022

(65) Prior Publication Data

US 2024/0094721 A1    Mar. 21, 2024

(51) Int. Cl.
*B64C 39/02*       (2023.01)
*G05B 17/02*       (2006.01)
(Continued)

(52) U.S. Cl.
CPC ............ *B64C 39/024* (2013.01); *G05B 17/02* (2013.01); *G05D 1/0044* (2013.01); *G05D 1/104* (2013.01);
(Continued)

(58) Field of Classification Search
CPC .... B64C 39/024; G05B 17/02; G05D 1/0044; G05D 1/104; B64U 2101/30; B64U 2101/60; B64U 2201/20
(Continued)

(56) References Cited

U.S. PATENT DOCUMENTS 8,244,779 B2    8/2012  Borg et al.
10,203,701 B2   2/2019  Kurdi et al.
(Continued)

FOREIGN PATENT DOCUMENTS

KR         102266235 B1    6/2021
WO     WO-2021133378 A1 *  7/2021  ................ B64F 5/60

OTHER PUBLICATIONS

Classification Definitions, Data Processing: Presentation Processing of Document, Operator Interface Processing, and Screen Saver Display Processing; Feb. 2011; pp. 1-33.*

*Primary Examiner* — Andrew R Dyer
(74) *Attorney, Agent, or Firm* — McDonnell Boehnen Hulbert & Berghoff LLP

(57) ABSTRACT

A method includes receiving configuration data for an unmanned aerial vehicle (UAV) simulation system, the configuration data indicating at least one base location specification, at least one aircraft specification, and at least one virtual vehicle specification and determining an aircraft record comprising, for each of the at least one aircraft to be simulated, aircraft mission data associated with an aircraft identifier of the at least one aircraft to be simulated. The method further includes configuring the UAV simulation system so that each of the at least one aircraft has a corresponding base location as specified by the at least one base location specification and a corresponding vehicle software version as specified by the at least one virtual vehicle specification and executing a simulation of the at least one aircraft carrying out flying missions by using the configured UAV simulation system and updating the aircraft mission data in the aircraft record.

18 Claims, 12 Drawing Sheets

(51) Int. Cl.
*G05D 1/00* (2006.01)
*B64U 101/30* (2023.01)
*B64U 101/60* (2023.01)

(52) U.S. Cl.
CPC ...... *B64U 2101/30* (2023.01); *B64U 2101/60* (2023.01); *B64U 2201/20* (2023.01)

(58) Field of Classification Search
USPC ............................................................ 701/2
See application file for complete search history.

(56) References Cited

U.S. PATENT DOCUMENTS

| | | |
|---|---|---|
| 10,885,240 B2 | 1/2021 | Tascione et al. |
| 11,094,205 B2 | 8/2021 | De La Cruz et al. |
| 2003/0023740 A1 | 1/2003 | White et al. |
| 2010/0256961 A1 | 10/2010 | Bush |
| 2013/0166271 A1 | 6/2013 | Danielsson et al. |
| 2016/0188765 A1* | 6/2016 | Vossler ................ G06F 11/261 703/8 |
| 2016/0376031 A1* | 12/2016 | Michalski ........... G08G 5/0013 701/15 |
| 2017/0004662 A1* | 1/2017 | Gong ..................... G07C 5/004 |
| 2017/0154339 A1* | 6/2017 | Kimberlin ............. G06Q 50/01 |
| 2019/0033893 A1 | 1/2019 | Duan et al. |
| 2020/0276708 A1* | 9/2020 | Shah ....................... B25J 19/04 |
| 2021/0302955 A1* | 9/2021 | Ponda ................. G08G 5/0034 |
| 2022/0247678 A1* | 8/2022 | Atwal ................... H04L 45/645 |
| 2022/0399936 A1* | 12/2022 | Arksey ............... H04B 17/3913 |
| 2023/0161341 A1* | 5/2023 | Montoya ................ B64D 47/08 701/3 |
| 2023/0297859 A1* | 9/2023 | Choi ..................... G06N 3/045 |
| 2024/0031196 A1* | 1/2024 | Peng .................. H04L 12/2876 |
| 2024/0416528 A1* | 12/2024 | Adler ................. G05B 19/4155 |

* cited by examiner

| Aircraft ID | Mission | State | Mission Data |
|---|---|---|---|
| Aircraft1 | Deliver item to house 1 | Active | |
| Aircraft2 | Deliver item to house 2 | Inactive | |
| Aircraft3 | Deliver item to building 2 | Active | |
| Aircraft4 | Deliver item to building 2 | Active | |
| Aircraft5 | Pick up item at house 3 | Active | |

600 → Aircraft1
602 → Aircraft2
604 → Aircraft3
606 → Aircraft4
608 → Aircraft5

Figure 6

```
message VirtualFleetConfig {
        repeated BaseLocations base_locations = 3;
        repeated AircraftSpecification aircraft = 3;
        Repeated VirtualVehicleSpecification virtual_vehicles = 4;
...
}
BaseLocations {
        display_name: "test_loc_0";
        zone {
                circle {
                        center {
                                latitude: 36.404128
                                longitude: -152.148161
                        }
                        radius: 100
...
}
Aircraft {
        base_location_name: "test_loc_0";
        aircraft_id: "aircraft1";
        aircraft_type: SERIES_7000W;
}
message VirtualVehicleSpecification {
        optional string virtual_vehicle_mpm_package = 2;
        wing.simultation.ModelConfig config = 3;
        optional string ct_param_blob_name = 4;
}
```
702

```
Params {
        aircraft_ids: ['aircraft1', 'aircraft2', 'aircraft3', 'aircraft5']
        config_protos:
        ['{aircraft_type: AIRCRAFT_7000_B
        home_gps_position { lat: 1.05172 lon: 0.42700 }
        sl_temperature_today_c: 25.0
        baro_drift_rate_pa_per_minute: 0.0
        terrain_mode: TERRAIN_MODE_WING_WORLD_MODEL
        fix_terrain_height_in_hover: true }',
        ...]
        virtual_vehicle_pkg_label = 'nightly'
}
```
704

Figure 7

| Aircraft ID | Mission | State | Mission Data |
|---|---|---|---|
| Aircraft1 | Deliver item to house 1 | Active | Location at 60s: (1.6, 0.7)... |
| Aircraft2 | Deliver item to house 2 | Inactive | Location at 60s: (1.0, 0.4)... |
| Aircraft3 | Deliver item to building 2 | Active | Location at 60s: (1.9, 0.3)... |
| Aircraft4 | Deliver item to building 2 | Active | Location at 60s: (1.7, 0.8)... |
| Aircraft5 | Pick up item at house 3 | Active | Location at 60s: (1.6, 0.5)... |

800 → Aircraft1
802 → Aircraft2
804 → Aircraft3
806 → Aircraft4
808 → Aircraft5

Figure 8

BACKEND AUTOMATION SYSTEM FOR SIMULATION OF DRONE DELIVERIES THROUGH VIRTUAL FLEETS

BACKGROUND

An unmanned vehicle, which may also be referred to as an autonomous vehicle, is a vehicle capable of travel without a physically-present human operator. An unmanned vehicle may operate in a remote-control mode, in an autonomous mode, or in a partially autonomous mode.

When an unmanned vehicle operates in a remote-control mode, a pilot or driver that is at a remote location can control the unmanned vehicle via commands that are sent to the unmanned vehicle via a wireless link. When the unmanned vehicle operates in autonomous mode, the unmanned vehicle typically moves based on pre-programmed navigation waypoints, dynamic automation systems, or a combination of these. Further, some unmanned vehicles can operate in both a remote-control mode and an autonomous mode, and in some instances may do so simultaneously. For instance, a remote pilot or driver may wish to leave navigation to an autonomous system while manually performing another task, such as operating a mechanical system for picking up objects, as an example.

Various types of unmanned vehicles exist for various different environments. For instance, unmanned vehicles exist for operation in the air, on the ground, underwater, and in space. Examples of unmanned aerial vehicles (UAVs) include quad-copters and tail-sitter UAVs, among others. Unmanned vehicles also exist for hybrid operations in which multi-environment operation is possible. Examples of hybrid unmanned vehicles include an amphibious craft that is capable of operation on land as well as on water or a floatplane that is capable of landing on water as well as on land. Other examples are also possible.

SUMMARY

Examples disclosed herein include methods for a backend automation system. The system may receive a minimal set of specifications, and the system may use the minimal set of specifications for configuring a simulation. When the simulation is executed, the system may update an aircraft record with aircraft mission data.

In a first aspect, a method includes receiving, by a computing device, configuration data for an unmanned aerial vehicle (UAV) simulation system, the configuration data specifying at least one base location specification, at least one aircraft specification, and at least one virtual vehicle specification. The at least one aircraft specification comprises at least one aircraft identifier for at least one aircraft to be simulated. The at least one virtual vehicle specification comprises at least one vehicle software version. The method further includes determining an aircraft record comprising, for each of the at least one aircraft to be simulated, aircraft mission data associated with an aircraft identifier of the at least one aircraft to be simulated. The method also includes configuring the UAV simulation system so that each of the at least one aircraft has a corresponding base location as specified by the at least one base location specification and a corresponding vehicle software version as specified by the at least one virtual vehicle specification. The method additionally includes executing a simulation of the at least one aircraft carrying out flying missions by using the configured UAV simulation system and updating the aircraft mission data in the aircraft record.

In a second aspect, a computing device is configured to carry out operations. The operations include receiving, by a computing device, configuration data for an unmanned aerial vehicle (UAV) simulation system, the configuration data specifying at least one base location specification, at least one aircraft specification, and at least one virtual vehicle specification. The at least one aircraft specification comprises at least one aircraft identifier for at least one aircraft to be simulated. The at least one virtual vehicle specification comprises at least one vehicle software version. The operations further include determining an aircraft record comprising, for each of the at least one aircraft to be simulated, aircraft mission data associated with an aircraft identifier of the at least one aircraft to be simulated. The operations also include configuring the UAV simulation system so that each of the at least one aircraft has a corresponding base location as specified by the at least one base location specification and a corresponding vehicle software version as specified by the at least one virtual vehicle specification. The operations additionally include executing a simulation of the at least one aircraft carrying out flying missions by using the configured UAV simulation system and updating the aircraft mission data in the aircraft record.

In a third aspect, a non-transitory computer readable medium comprising program instructions executable by one or more processors to perform operations comprising receiving, by a computing device, configuration data for an unmanned aerial vehicle (UAV) simulation system, the configuration data specifying at least one base location specification, at least one aircraft specification, and at least one virtual vehicle specification. The at least one aircraft specification comprises at least one aircraft identifier for at least one aircraft to be simulated. The at least one virtual vehicle specification comprises at least one vehicle software version. The operations further comprise determining an aircraft record comprising, for each of the at least one aircraft to be simulated, aircraft mission data associated with an aircraft identifier of the at least one aircraft to be simulated. The operations also comprise configuring the UAV simulation system so that each of the at least one aircraft has a corresponding base location as specified by the at least one base location specification and a corresponding vehicle software version as specified by the at least one virtual vehicle specification. The operations additionally comprise executing a simulation of the at least one aircraft carrying out flying missions by using the configured UAV simulation system and updating the aircraft mission data in the aircraft record.

In a fourth aspect, a system is provided that includes means for receiving, by a computing device, configuration data for an unmanned aerial vehicle (UAV) simulation system, the configuration data specifying at least one base location specification, at least one aircraft specification, and at least one virtual vehicle specification. The at least one aircraft specification comprises at least one aircraft identifier for at least one aircraft to be simulated. The at least one virtual vehicle specification comprises at least one vehicle software version. The system further includes means for determining an aircraft record comprising, for each of the at least one aircraft to be simulated, aircraft mission data associated with an aircraft identifier of the at least one aircraft to be simulated. The system also includes means for configuring the UAV simulation system so that each of the at least one aircraft has a corresponding base location as specified by the at least one base location specification and a corresponding vehicle software version as specified by the at least one virtual vehicle specification. The system additionally includes means for executing a simulation of the at least one aircraft carrying out flying missions by using the configured IJAV simulation system and updating the aircraft mission data in the aircraft record.

These, as well as other aspects, advantages, and alternatives, will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

BRIEF DESCRIPTION OF THE DRAWINGS

FIG. 6 illustrates aircraft records, in accordance with example embodiments.

FIG. 7 is a block diagram illustrating example software instructions to configure a backend simulation system, in accordance with example embodiments.

FIG. 8 illustrates updated aircraft records, in accordance with example embodiments.

DETAILED DESCRIPTION

Figure 1A:
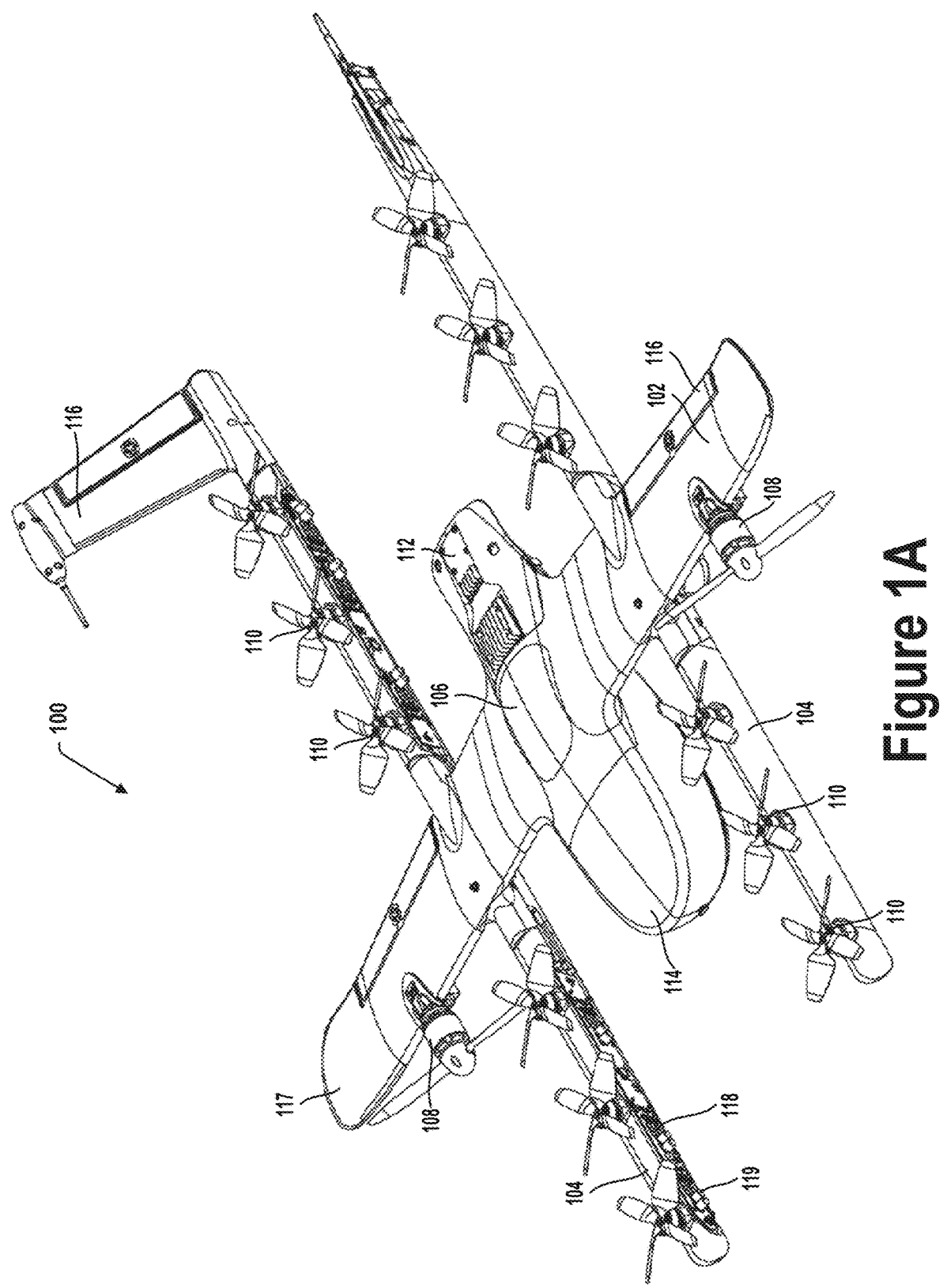
FIG. 1A is a simplified illustration of an unmanned aerial vehicle, according to example embodiments, in accordance with example embodiments.

Exemplary methods and systems are described herein. It should be understood that the word "exemplary" is used herein to mean "serving as an example, instance, or illustration." Any implementation or feature described herein as "exemplary" or "illustrative" is not necessarily to be construed as preferred or advantageous over other implementations or features. In the figures, similar symbols typically identify similar components, unless context dictates otherwise. The example implementations described herein are not meant to be limiting. It will be readily understood that the aspects of the present disclosure, as generally described herein, and illustrated in the figures, can be arranged, substituted, combined, separated, and designed in a wide variety of different configurations, all of which are contemplated herein.

I. OVERVIEW

Simulating one or more autonomous aircrafts operating in an environment may be useful to evaluate software updates, potential obstacles, possible configuration errors, aircraft interactions, among other examples. To simulate aircraft flight, a computing device may execute a virtual vehicle tool. The virtual vehicle tool may run a physics simulator and may be connected to a backend system which may facilitate simulating how an actual physical aircraft may behave under certain operating and environmental conditions.

In some examples, it may be useful to simulate a fleet of aircrafts (e.g., a plurality of aircrafts). However, users may have difficulties configuring the backend system for the location and behavior of each aircraft when simulating many aircrafts. Configuring the backend system may be even more difficult and time consuming when the user desires to simulate many aircrafts and test many different software versions or other configurations in various simulations.

Provided herein are methods for a backend automation system to create and launch fleets of aircrafts to simulate aircraft delivery operations. This system may create base locations and aircraft records. In addition, the system may configure parameters for virtual vehicle binaries for the fleet of aircrafts, which may be used for determining the behavior of the aircrafts in the simulation. With this design, a user may create entire virtual fleets in a short amount of time, which may enable the large-scale simulation of drone delivery operations. In addition to the creation and launch of virtual fleets, the backend automation system may support continuously monitoring the performance of fleets, fleet management tooling, virtual order simulation, system failure injection, and air traffic simulation of multiple aircrafts operating in one or more regions.

The tooling may include a number of components. For example, the tooling may include a protocol buffer specification that may specify what to build and/or launch. The tooling may also include a converter that may convert a file from one format to another format. For example, a graphical user interface may be provided that includes a map to enable a user to specify base locations and geofences (e.g., a boundary within which the aircrafts may operate). This graphical user interface may be configured to output a file of a specific format (e.g., a Keyhole Markup Language (kml) file, a Extensible Markup Language (XML) file, among other examples). The tooling may convert this file into another format, such as a format to be used by the backend to simulate the fleet of aircrafts. The tooling may further include a set of software modules that may handle the creation and/or launching of base locations, aircraft records, virtual vehicles, among other entities of the simulation. Further, the tooling may include a command line interface, which may facilitate user input of fleet creation requests into the tooling.

After configuring and launching the fleet, the virtual vehicle binaries may be run on one or more computing systems. The one or more computing systems may be part of a cluster management system for scheduling and managing applications across data centers. As part of this process, the configuration data may be checked into version control.

In some examples, the computing system may receive configuration data for a UAV simulation system, where the configuration data includes at least one base location specification, at least one aircraft specification, and at least one virtual vehicle specification. A computing system may receive this configuration data through receiving a subset of the at least one base location specification, at least one aircraft specification, and/or at least one virtual vehicle specification. For example, the computing system may receive a base location specification, which the computing system may then use to automatically generate at least one aircraft specification and at least one virtual vehicle specification. In particular, the computing system may generate as many aircraft specifications as there are locations specified in the base location specification.

The configuration data may contain various elements, including at least one base location specification, at least one aircraft specification, and at least one virtual vehicle specification. The base location specification may include coordinates (e.g., longitude and latitude) representing one or more physical locations. Additionally and/or alternatively, the base location specification may indicate a quantity of base locations to generate, an area in which to generate base locations, and/or a characteristic of that base location area. For example, the base location specification may specify that the computing system should create ten locations from which aircrafts may depart, and/or the base location specification may specify that the computing system should create locations from which aircrafts may depart at every fast food location within an area of the environment.

The computing system may also determine an aircraft record that includes aircraft mission data associated with the aircraft identifier. The aircraft record may also include information on one or more missions assigned to the aircraft, a state of the aircraft (e.g., whether the aircraft is active or not), and/or mission data to be collected while executing the simulation.

The computing system may configure the UAV configuration system so that each aircraft has a corresponding base location as specified by the base location specification. In addition, the computing system may configure the UAV configuration system so that each aircraft has a corresponding vehicle software version specified by the at least one virtual vehicle specification.

With the UAV configuration system set up, the computing system may execute a simulation of each aircraft carrying out flying missions. The computing system may update aircraft mission data in the aircraft record while executing the simulation of the aircraft carrying out flying missions. For example, the computing system may store where each aircraft is located at a particular time in the simulation, whether the flying mission was completed successfully, among other data that may be useful for analyzing aircraft behavior during the simulation.

II. EXAMPLE UNMANNED VEHICLES

Herein, the terms "unmanned aerial vehicle" and "UAV" refer to any autonomous or semi-autonomous vehicle that is capable of performing some functions without a physically present human pilot.

A UAV can take various forms. For example, a UAV may take the form of a fixed-wing aircraft, a glider aircraft, a tail-sitter aircraft, a jet aircraft, a ducted fan aircraft, a lighter-than-air dirigible such as a blimp or steerable balloon, a rotorcraft such as a helicopter or multicopter, and/or an ornithopter, among other possibilities. Further, the terms "drone," "unmanned aerial vehicle system" (UAVS), or "unmanned aerial system" (UAS) may also be used to refer to a UAV.

FIG. 1A is an isometric view of an example UAV 100, UAV 100 includes wing 102, booms 104, and a fuselage 106. Wings 102 may be stationary and may generate lift based on the wing shape and the UAV's forward airspeed. For instance, the two wings 102 may have an airfoil-shaped cross section to produce an aerodynamic force on UAV 100. In some embodiments, wing 102 may carry horizontal propulsion units 108, and booms 104 may carry vertical propulsion units 110. In operation, power for the propulsion units may be provided from a battery compartment 112 of fuselage 106. In some embodiments, fuselage 106 also includes an avionics compartment 114, an additional battery compartment lot shown) and/or a delivery unit (not shown, e.g., a winch system) for handling the payload. In some embodiments, fuselage 106 is modular, and two or more compartments (e.g., battery compartment 112, avionics compartment 114, other payload and delivery compartments) are detachable from each other and securable to each other (e.g., mechanically, magnetically, or otherwise) to contiguously form at least a portion of fuselage 106.

In some embodiments, booms 104 terminate in rudders 116 for improved yaw control of UAV 100. Further, wings 102 may terminate in wing tips 117 for improved control of lift of the UAV.

In the illustrated configuration, UAV 100 includes a structural frame. The structural frame may be referred to as a "structural H-frame" or an "H-frame" (not shown) of the UAV. The H-frame may include, within wings 102, a wing spar (not shown) and, within booms 104, boom carriers (not shown). In some embodiments the wing spar and the boom carriers may be made of carbon fiber, hard plastic, aluminum, light metal alloys, or other materials. The wing spar and the boom carriers may be connected with clamps. The wing spar may include pre-drilled holes for horizontal propulsion units 108, and the boom carriers may include pre-drilled holes for vertical propulsion units 110.

In some embodiments, fuselage 106 may be removably attached to the H-frame (e.g., attached to the wing spar by clamps, configured with grooves, protrusions or other features to mate with corresponding H-frame features, etc.). In other embodiments, fuselage 106 similarly may be removably attached to wings 102. The removable attachment of fuselage 106 may improve quality and or modularity of UAV 100. For example, electrical/mechanical components and/or subsystems of fuselage 106 may be tested separately from, and before being attached to, the H-frame. Similarly, printed circuit boards (PCBs) 118 may be tested separately from, and before being attached to, the boom carriers, therefore eliminating defective parts/subassemblies prior to completing the UAV. For example, components of fuselage 106 (e.g., avionics, battery unit, delivery units, an additional battery compartment, etc.) may be electrically tested before fuselage 106 is mounted to the H-frame. Furthermore, the motors and the electronics of PCBs 118 may also be electrically tested before the final assembly. Generally, the identification of the defective parts and subassemblies early in the assembly process lowers the overall cost and lead time of the UAV. Furthermore, different types/models of fuselage 106 may be attached to the H-frame, therefore improving the modularity of the design. Such modularity allows these various parts of UAV 100 to be upgraded without a substantial overhaul to the manufacturing process.

In some embodiments, a wing shell and boom shells may be attached to the H-frame by adhesive elements (e.g., adhesive tape, double-sided adhesive tape, glue, etc.). Therefore, multiple shells may be attached to the H-frame instead of having a monolithic body sprayed onto the H-flame. In some embodiments, the presence of the multiple shells reduces the stresses induced by the coefficient of thermal expansion of the structural frame of the UAV. As a result, the UAV may have better dimensional accuracy and/or improved reliability.

Moreover, in at least some embodiments, the same H-frame may be used with the wing shell and/or boom shells having different size and/or design, therefore improving the modularity and versatility of the UAV designs. The wing shell and/or the boom shells may be made of relatively light polymers (e.g., closed cell foam) covered by the harder, but relatively thin, plastic skins.

The power and/or control signals from fuselage 106 may be routed to PCBs 118 through cables running through fuselage 106, wings 102, and booms 104. In the illustrated embodiment, UAV 100 has four PCBs, but other numbers of PCBs are also possible. For example, UAV 100 may include two PCBs, one per the boom. The PCBs carry electronic components 119 including, for example, power converters, controllers, memory, passive components, etc. In operation, propulsion units 108 and 110 of UAV 100 are electrically connected to the PCBs.

Many variations on the illustrated UAV are possible. For instance, fixed-wing UAVs may include more or fewer rotor units (vertical or horizontal), and/or may utilize a ducted fan or multiple ducted fans for propulsion. Further, UAVs with more wings (e.g., an "x-wing" configuration with four wings), are also possible. Although FIG. 1 illustrates two wings 102, two booms 104, two horizontal propulsion units 108, and six vertical propulsion units 110 per boom 104, it should be appreciated that other variants of UAV 1.00 may be implemented with more or less of these components. For example, UAV 100 may include four wings 102, four booms 104, and more or less propulsion units (horizontal or vertical).

Figure 1B:
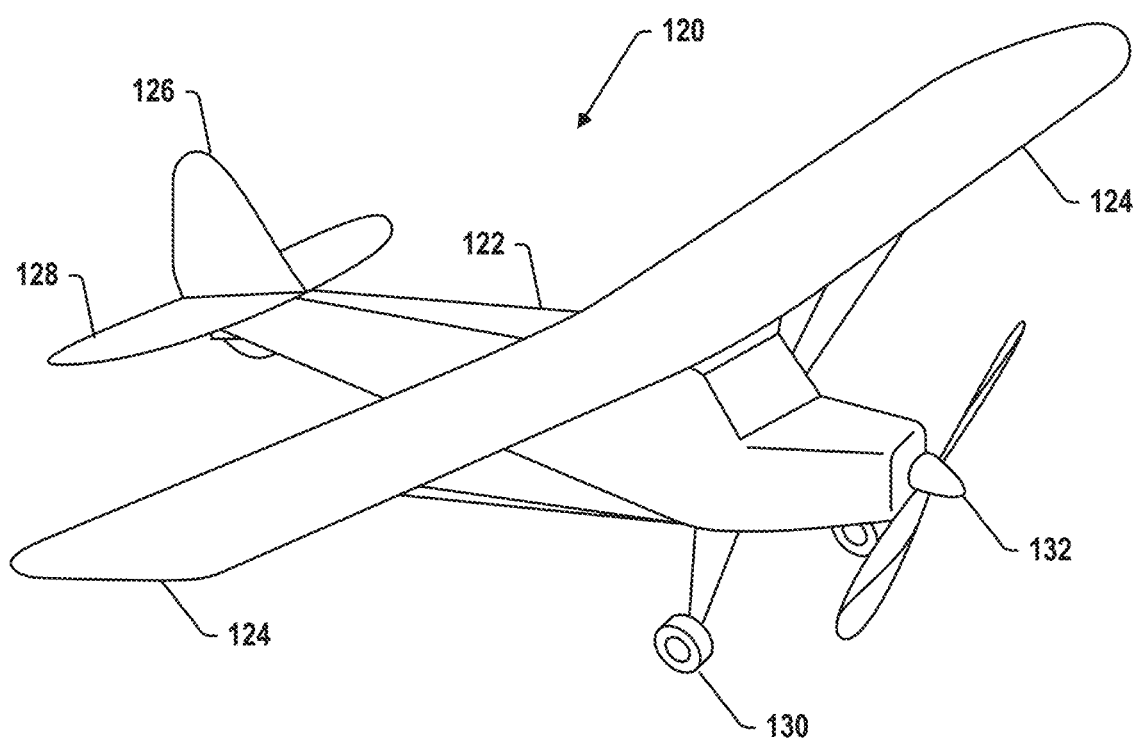
FIG. 1B is a simplified illustration of an unmanned aerial vehicle, according to example embodiments, in accordance with example embodiments.

Similarly, FIG. 1B shows another example of a fixed-wing UAV 120. The fixed-wing UAV 120 includes a fuselage 122, two wings 124 with an airfoil-shaped cross section to provide lift for the UAV 120, a vertical stabilizer 126 (or fin) to stabilize the plane's yaw (turn left or right), a horizontal stabilizer 128 (also referred to as an elevator or tailplane) to stabilize pitch (tilt up or down), landing gear 130, and a propulsion unit 132, which can include a motor, shaft, and propeller.

Figure 1C:
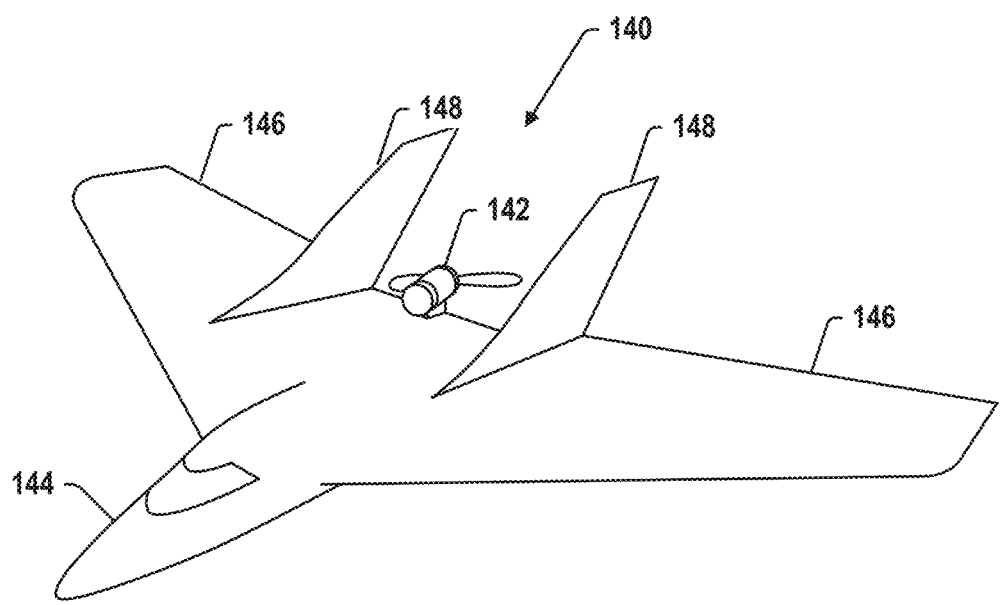
FIG. 1C is a simplified illustration of an unmanned aerial vehicle, according to example embodiments, in accordance with example embodiments.

FIG. 1C shows an example of a UAV 140 with a propeller in a pusher configuration. The term "pusher" refers to the fact that a propulsion unit 142 is mounted at the back of the UAV and "pushes" the vehicle forward, in contrast to the propulsion unit being mounted at the front of the UAV. Similar to the description provided for FIGS. 1A and 1B, FIG. 1C depicts common structures used in a pusher plane, including a fuselage 144, two wings 146, vertical stabilizers 148, and the propulsion unit 142, which can include a motor, shaft, and propeller.

Figure 1D:
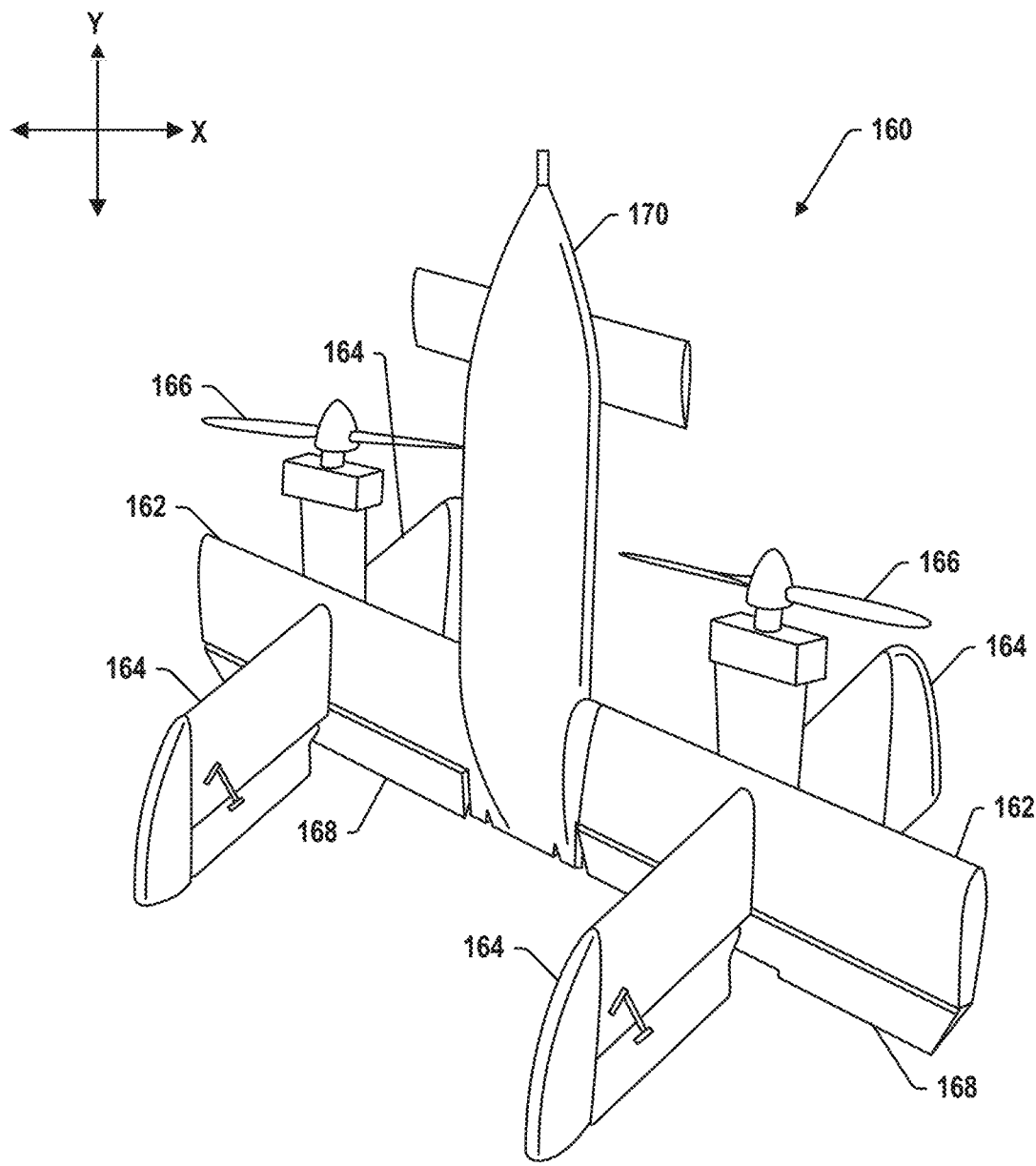
FIG. 1D is a simplified illustration of an unmanned aerial vehicle, according to example embodiments, in accordance with example embodiments.

FIG. 1D shows an example of a tail-sitter UAV 160. In the illustrated example, the tail-sitter UAV 160 has fixed wings 162 to provide lift and allow the UAV 160 to glide horizontally (e.g., along the x-axis, in a position that is approximately perpendicular to the position shown in FIG. 1D). However, the fixed wings 162 also allow the tail-sitter UAV 160 to take off and land vertically on its own.

For example, at a launch site, the tail-sitter UAV 160 may be positioned vertically (as shown) with its fins 164 and/or wings 162 resting on the ground and stabilizing the UAV 160 in the vertical position. The tail-sitter UAV 160 may then take off by operating its propellers 166 to generate an upward thrust (e.g., a thrust that is generally along the y-axis). Once at a suitable altitude, the tail-sitter UAV 160 may use its flaps 168 to reorient itself in a horizontal position, such that its fuselage 170 is closer to being aligned with the x-axis than the y-axis. Positioned horizontally, the propellers 166 may provide forward thrust so that the tail-sitter UAV 160 can fly in a similar manner as a typical airplane.

Many variations on the illustrated fixed-wing UAVs are possible. For instance, fixed-wing UAVs may include more or fewer propellers, and/or may utilize a ducted fan or multiple ducted fans for propulsion. Further, UAVs with more wings (e.g., an "x-wing" configuration with four wings), with fewer wings, or even with no wings, are also possible.

Figure 1E:
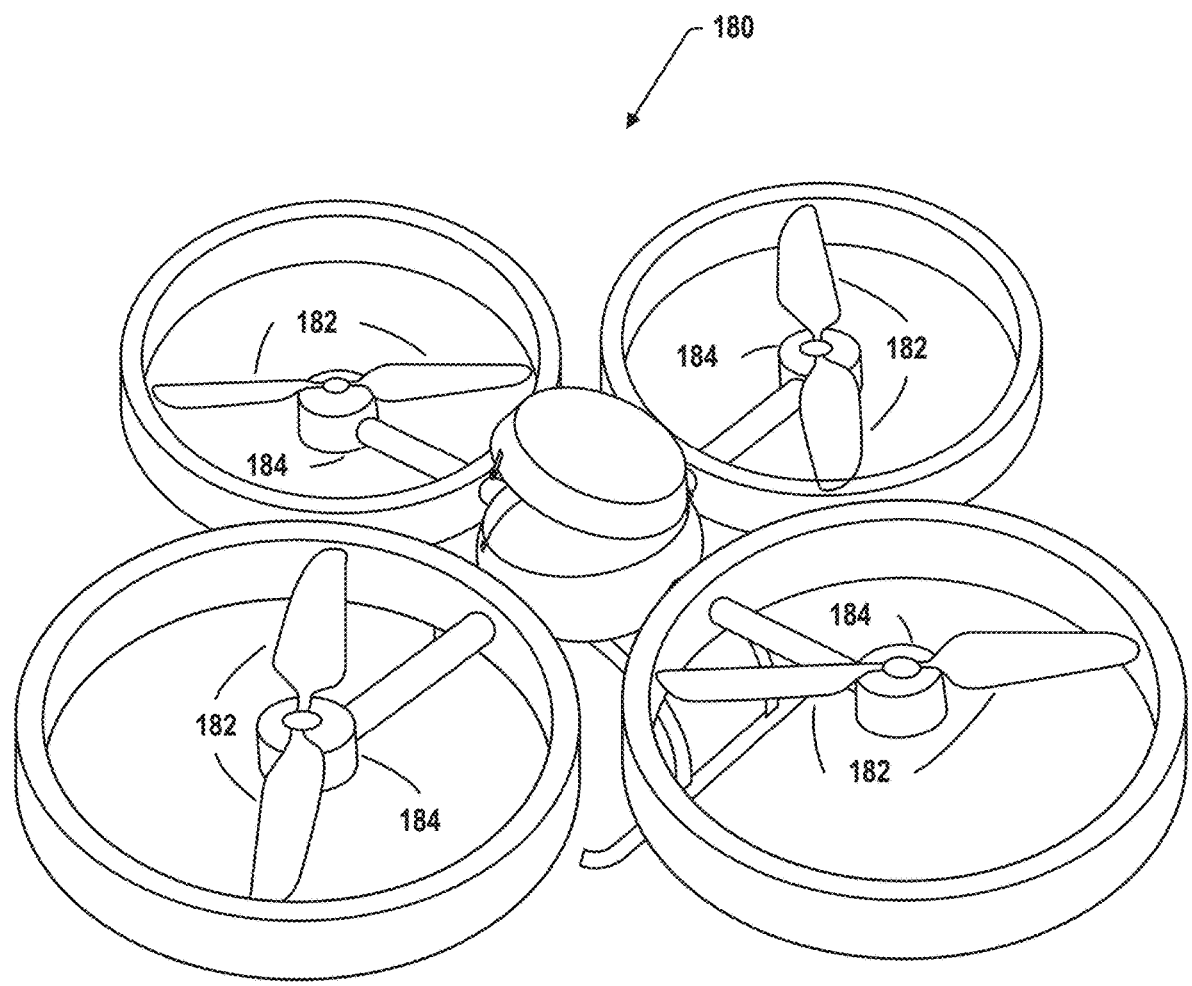
FIG. 1E is a simplified illustration of an unmanned aerial vehicle, according to example embodiments, in accordance with example embodiments.

As noted above, some embodiments may involve other types of UAVs, in addition to or in the alternative to fixed-wing UAVs. For instance, FIG. 1E shows an example of a rotorcraft that is commonly referred to as a multicopter 180. The multicopter 180 may also be referred to as a quadcopter, as it includes four rotors 182. It should be understood that example embodiments may involve a rotorcraft with more or fewer rotors than the multicopter 180. For example, a helicopter typically has two rotors. Other examples with three or more rotors are possible as well. Herein, the term "multicopter" refers to any rotorcraft having more than two rotors, and the term "helicopter" refers to rotorcraft having two rotors.

Referring to the multicopter 180 in greater detail, the four rotors 182 provide propulsion and maneuverability for the multicopter 180. More specifically, each rotor 182 includes blades that are attached to a motor 184. Configured as such, the rotors 182 may allow the multicopter 180 to take off and land vertically, to maneuver in any direction, and/or to hover. Further, the pitch of the blades may be adjusted as a group and/or differentially, and may allow the multicopter 180 to control its pitch, roll, yaw, and/or altitude.

It should be understood that references herein to "unmanned" aerial vehicle or UAV can apply equally to autonomous and semi-autonomous aerial vehicles. In an autonomous implementation, all functionality of the aerial vehicle is automated; e.g., pre-programmed or controlled via real-time computer functionality that responds to input from various sensors and/or pre-determined information. In a semi-autonomous implementation, some functions of an aerial vehicle may be controlled by a human operator, while other functions are carried out autonomously. Further, in some embodiments, a UAV may be configured to allow a remote operator to take over functions that can otherwise be controlled autonomously by the UAV. Yet further, a given type of function may be controlled remotely at one level of abstraction and performed autonomously at another level of abstraction. For example, a remote operator could control high level navigation decisions for a UAV, such as by specifying that the UAV should travel from one location to another (e.g., from a warehouse in a suburban area to a delivery address in a nearby city), while the UAV's navigation system autonomously controls more fine-grained navigation decisions, such as the specific route to take between the two locations, specific flight controls to achieve the route and avoid obstacles while navigating the route, and so on.

More generally, it should be understood that the example UAVs described herein are not intended to be limiting. Example embodiments may relate to, be implemented within, or take the form of any type of unmanned aerial vehicle.

III. ILLUSTRATIVE UAV COMPONENTS

Figure 2:
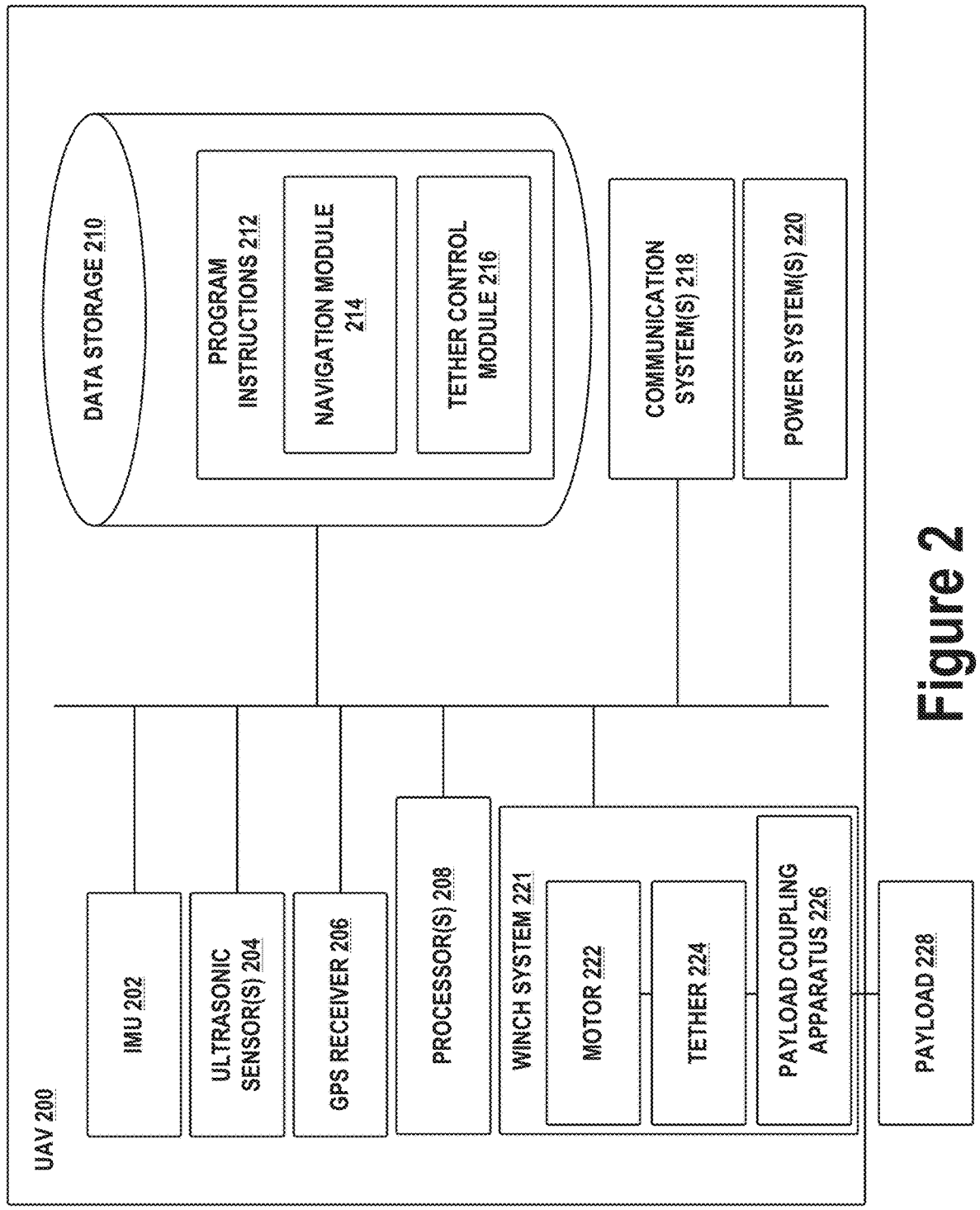
FIG. 2 is a simplified block diagram illustrating components of an unmanned aerial vehicle, in accordance with example embodiments.

FIG. 2 is a simplified block diagram illustrating components of a UAV 200, according to an example embodiment.

UAV 200 may take the form of, or be similar in form to, one of the UAVs 100, 120, 140, 160, and 180 described in reference to FIGS. 1A-1E. However, UAV 200 may also take other forms.

UAV 200 may include various types of sensors, and may include a computing system configured to provide the functionality described herein. In the illustrated embodiment, the sensors of UAV 200 include an inertial measurement unit (IMU) 202, ultrasonic sensor(s) 204, and a UPS 206, among other possible sensors and sensing systems.

In the illustrated embodiment, UAV 200 also includes one or more processors 208. A processor 208 may be a general-purpose processor or a special purpose processor (e.g., digital signal processors, application specific integrated circuits, etc.). The one or more processors 208 can be configured to execute computer-readable program instructions 212 that are stored in the data storage 210 and are executable to provide the functionality of a UAV described herein.

The data storage 210 may include or take the form of one or more computer-readable storage media that can be read or accessed by at least one processor 208. The one or more computer-readable storage media can include volatile and/or non-volatile storage components, such as optical, magnetic, organic or other memory or disc storage, which can be integrated in whole or in part with at least one of the one or more processors 208. In some embodiments, the data storage 210 can be implemented using a single physical device one optical, magnetic, organic or other memory or disc storage unit), while in other embodiments, the data storage 210 can be implemented using two or more physical devices.

As noted, the data storage 210 can include computer-readable program instructions 212 and perhaps additional data, such as diagnostic data of the UAV 200. As such, the data storage 210 may include program instructions 212 to perform or facilitate some or all of the UAV functionality described herein. For instance, in the illustrated embodiment, program instructions 212 include a navigation module 214 and a tether control module 216.

A. Sensors

In an illustrative embodiment, IMU 202 may include both an accelerometer and a gyroscope, which may be used together to determine an orientation of the UAV 200. In particular, the accelerometer can measure the orientation of the vehicle with respect to earth, while the gyroscope measures the rate of rotation around an axis. IMUs are commercially available in low-cost, low-power packages. For instance, an IMU 202 may take the form of or include a miniaturized MicroElectroMechanical System (MEMS) or a Nanoelectromechanical System (NEMS). Other types of IMUs may also be utilized.

An MU 202 may include other sensors, in addition to accelerometers and gyroscopes, which may help to better determine position and/or help to increase autonomy of the UAV 200. Two examples of such sensors are magnetometers and pressure sensors. In some embodiments, a UAV may include a low-power, digital 3-axis magnetometer, which can be used to realize an orientation independent electronic compass for accurate heading information. However, other types of magnetometers may be utilized as well. Other examples are also possible. Further, note that a UAV could include some or all of the above-described inertia sensors as separate components from an MU.

UAV 200 may also include a pressure sensor or barometer, which can be used to determine the altitude of the UAV 200. Alternatively, other sensors, such as sonic altimeters or radar altimeters, can be used to provide an indication of altitude, which may help to improve the accuracy of and/or prevent drift of an IMU.

In a further aspect. UAV 200 may include one or more sensors that allow the UAV to sense objects in the environment. For instance, in the illustrated embodiment, UAV 200 includes ultrasonic sensors) 204. Ultrasonic sensor(s) 204 can determine the distance to an object by generating sound waves and determining the time interval between transmission of the wave and receiving the corresponding echo off an object. A typical application of an ultrasonic sensor for unmanned vehicles or IMUs is low-level altitude control and obstacle avoidance. An ultrasonic sensor can also be used for vehicles that need to hover at a certain height or need to be capable of detecting obstacles. Other systems can be used to determine, sense the presence of, and/or determine the distance to nearby objects, such as a light detection and ranging (LIDAR) system, laser detection and ranging (LADAR) system, and/or an infrared or forward-looking infrared (FLIR) system, among other possibilities.

In some embodiments, UAV 200 may also include one or more imaging system(s). For example, one or more still and/or video cameras may be utilized by UAV 200 to capture image data from the UAV's environment. As a specific example, charge-coupled device (CCD) cameras or complementary metal-oxide-semiconductor (CMOS) cameras can be used with unmanned vehicles. Such imaging sensor(s) have numerous possible applications, such as obstacle avoidance, localization techniques, ground tracking for more accurate navigation (e.g., by applying optical flow techniques to images), video feedback, and/or image recognition and processing, among other possibilities.

UAV 200 may also include a GPS receiver 206. The GPS receiver 206 may be configured to provide data that is typical of well-known GPS systems, such as the GI'S coordinates of the UAV 200. Such GPS data may be utilized by the UAV 200 for various functions. As such, the UAV may use its GPS receiver 206 to help navigate to the caller's location, as indicated, at least in part, by the GPS coordinates provided by their mobile device. Other examples are also possible.

B. Navigation and Location Determination

The navigation module 214 may provide functionality that allows the UAV 200 to, e.g., move about its environment and reach a desired location. To do so, the navigation module 214 may control the altitude and/or direction of flight by controlling the mechanical features of the UAV that affect flight (e.g., its rudder(s), elevator(s), aileron(s), and/or the speed of its propeller(s)).

In order to navigate the UAV 200 to a target location, the navigation module 214 may implement various navigation techniques, such as map-based navigation and localization-based navigation, for instance. With map-based navigation, the UAV 200 may be provided with a map of its environment, which may then be used to navigate to a particular location on the map. With localization-based navigation, the UAV 200 may be capable of navigating in an unknown environment using localization. Localization-based navigation may involve the UAV 200 building its own map of its environment and calculating its position within the map and/or the position of objects in the environment. For example, as a UAV 200 moves throughout its environment, the UAV 200 may continuously use localization to update its map of the environment. This continuous mapping process may be referred to as simultaneous localization and mapping (SLAM). Other navigation techniques may also be utilized.

In some embodiments, the navigation module 214 may navigate using a technique that relies on waypoints. In particular, waypoints are sets of coordinates that identify points in physical space. For instance, an air-navigation waypoint may be defined by a certain latitude, longitude, and altitude. Accordingly, navigation module 214 may cause UAV 200 to move from waypoint to waypoint, in order to ultimately travel to a final destination (e.g., a final waypoint in a sequence of waypoints).

In a further aspect, the navigation module 214 and/or other components and systems of the UAV 200 may be configured for "localization" to more precisely navigate to the scene of a target location. More specifically, it may be desirable in certain situations for a UAV to be within a threshold distance of the target location where a payload 228 is being delivered by a UAV (e.g., within a few feet of the target destination). To this end, a UAV may use a two-tiered approach in which it uses a more-general location-determination technique to navigate to a general area that is associated with the target location, and then use a more-refined location-determination technique to identify and/or navigate to the target location within the general area.

For example, the UAV 200 may navigate to the general area of a target destination where a payload 228 is being delivered using waypoints and/or map-based navigation. The UAV may then switch to a mode in which it utilizes a localization process to locate and travel to a more specific location. For instance, if the UAV 200 is to deliver a payload to a user's home, the UAV 200 may need to be substantially close to the target location in order to avoid delivery of the payload to undesired areas (e.g., onto a roof, into a pool, onto a neighbor's property, etc.). However, a GPS signal may only get the UAV 200 so far (e.g., within a block of the user's home). A more precise location-determination technique may then be used to find the specific target location.

Various types of location-determination techniques may be used to accomplish localization of the target delivery location once the UAV 200 has navigated to the general area of the target delivery location. For instance, the UAV 200 may be equipped with one or more sensory systems, such as, for example, ultrasonic sensors 204, infrared sensors (not shown), and/or other sensors, which may provide input that the navigation module 214 utilizes to navigate autonomously or semi-autonomously to the specific target location.

As another example, once the UAV 200 reaches the general area of the target delivery location (or of a moving subject such as a person or their mobile device), the UAV 200 may switch to a "fly-by-wire" mode where it is controlled, at least in part, by a remote operator, who can navigate the UAV 200 to the specific target location. To this end, sensory data from the UAV 200 may be sent to the remote operator to assist them in navigating the UAV 200 to the specific location.

As yet another example, the UAV 200 may include a module that is able to signal to a passer-by for assistance in either reaching the specific target delivery location; for example, the UAV 200 may display a visual message requesting such assistance in a graphic display, play an audio message or tone through speakers to indicate the need for such assistance, among other possibilities. Such a visual or audio message might indicate that assistance is needed in delivering the UAV 200 to a particular person or a particular location, and might provide information to assist the passer-by in delivering the UAV 200 to the person or location (e.g., a description or picture of the person or location, and/or the person or location's name), among other possibilities. Such a feature can be useful in a scenario in which the UAV is unable to use sensory functions or another location-determination technique to reach the specific target location. However, this feature is not limited to such scenarios.

In some embodiments, once the UAV 200 arrives at the general area of a target delivery location, the UAV 200 may utilize a beacon from a user's remote device (e.g., the user's mobile phone) to locate the person. Such a beacon may take various forms. As an example, consider the scenario where a remote device, such as the mobile phone of a person who requested a UAV delivery, is able to send out directional signals (e.g., via an RF signal, a light signal and/or an audio signal). In this scenario, the UAV 200 may be configured to navigate by "sourcing" such directional signals in other words, by determining where the signal is strongest and navigating accordingly. As another example, a mobile device can emit a frequency, either in the human range or outside the human range, and the UAV 200 can listen for that frequency and navigate accordingly. As a related example, if the UAV 200 is listening for spoken commands, then the UAV 200 could utilize spoken statements, such as "I'm over here!" to source the specific location of the person requesting delivery of a payload.

In an alternative arrangement, a navigation module may be implemented at a remote computing device, which communicates wirelessly with the UAV 200. The remote computing device may receive data indicating the operational state of the UAV 200, sensor data from the UAV 200 that allows it to assess the environmental conditions being experienced by the UAV 200, and/or location information for the UAV 200. Provided with such information, the remote computing device may determine latitudinal and/or directional adjustments that should be made by the UAV 200 and/or may determine how the UAV 200 should adjust its mechanical features (e.g., its rudder(s), elevator(s), aileron (s), and/or the speed of its propeller(s)) in order to effectuate such movements. The remote computing system may then communicate such adjustments to the UAV 200 so it can move in the determined manner.

C. Communication Systems

In a further aspect, the UAV 200 includes one or more communication systems 218. The communications systems 218 may include one or more wireless interfaces and/or one or more wireline interfaces, which allow the UAV 200 to communicate via one or more networks. Such wireless interfaces may provide for communication under one or more wireless communication protocols, such as Bluetooth. WiFi (e.g., an IEEE 802.11 protocol), bong-Term Evolution (LIE), WiMAX (e.g., an IEEE 802.16 standard), a radio-frequency ID (MD) protocol, near-field communication (NFC), and/or other wireless communication protocols. Such wireline interfaces may include an Ethernet interface, a Universal Serial Bus (USB) interface, or similar interface to communicate via a wire, a twisted pair of wires, a coaxial cable, an optical link, a fiber-optic link, or other physical connection to a wireline network.

In some embodiments, a UAV 200 may include communication systems 218 that allow for both short-range communication and long-range communication. For example, the UAV 200 may be configured for short-range communications using Bluetooth and for long-range communications under a CDMA protocol. In such an embodiment, the UAV 200 may be configured to function as a "hot spot;" or in other words, as a gateway or proxy between a remote support device and one or more data networks, such as a cellular network and/or the Internet. Configured as such, the UAV 200 may facilitate data communications that the remote support device would otherwise be unable to perform by itself.

For example, the UAV 200 may provide a WiFi connection to a remote device, and serve as a proxy or gateway to a cellular service provider's data network, which the UAV might connect to under an LTE or a 3G protocol, for instance. The UAV 200 could also serve as a proxy or gateway to a high-altitude balloon network, a satellite network, or a combination of these networks, among others, which a remote device might not be able to otherwise access.

D. Power Systems

In a further aspect, the UAV 200 may include power system(s) 220. The power system 220 may include one or more batteries for providing power to the UAV 200. In one example, the one or more batteries may be rechargeable and each battery may be recharged via a wired connection between the battery and a power supply and/or via a wireless charging system, such as an inductive charging system that applies an external time-varying magnetic field to an internal battery.

E. Payload Delivery

The UAV 200 may employ various systems and configurations in order to transport and deliver a payload 228. In some implementations, the payload 228 of a given UAV 200 may include or take the form of a "package" designed to transport various goods to a target delivery location. For example, the UAV 200 can include a compartment, in which an item or items may be transported. Such a package may include one or more food items, purchased goods, medical items, or any other object(s) having a size and weight suitable to be transported between two locations by the UAV. In other embodiments, a payload 228 may simply be the one or more items that are being delivered (e.g., without any package housing the items).

In some embodiments, the payload 228 may be attached to the UAV and located substantially outside of the UAV during some or all of a flight by the UAV. For example, the package may be tethered or otherwise releasably attached below the UAV during flight to a target location. In some embodiments, the package may include various features that protect its contents from the environment, reduce aerodynamic drag on the system, and prevent the contents of the package from shifting during UAV flight. In other embodiments, the package may be a standard shipping package that is not specifically tailored for UAV flight.

In order to deliver the payload, the UAV may include a winch system 221 controlled by the tether control module 216 in order to lower the payload 228 to the ground while the UAV hovers above. As shown in FIG. 2, the winch system 221 may include a tether 224, and the tether 224 may be coupled to the payload 228 by a payload retriever 226. The tether 224 may be wound on a spool that is coupled to a motor 222 of the UAV. The motor 222 may take the form of a DC motor (e.g., a servo motor) that can be actively controlled by a speed controller. The tether control module 216 can control the speed controller to cause the motor 222 to rotate the spool, thereby unwinding or retracting the tether 224 and lowering or raising the payload retriever 226. In practice, the speed controller may output a desired operating rate (e.g., a desired RPM) for the spool, which may correspond to the speed at which the tether 224 and payload 228 should be lowered towards the ground. The motor 222 may then rotate the spool so that it maintains the desired operating rate.

In order to control the motor 222 via the speed controller, the tether control module 216 may receive data from a speed sensor (e.g., an encoder) configured to convert a mechanical position to a representative analog or digital signal. In particular, the speed sensor may include a rotary encoder that may provide information related to rotary position (and/or rotary movement) of a shaft of the motor or the spool coupled to the motor, among other possibilities. Moreover, the speed sensor may take the form of an absolute encoder and/or an incremental encoder, among others. So in an example implementation, as the motor 222 causes rotation of the spool, a rotary encoder may be used to measure this rotation. In doing so, the rotary encoder may be used to convert a rotary position to an analog or digital electronic signal used by the tether control module 216 to determine the amount of rotation of the spool from a fixed reference angle and/or to an analog or digital electronic signal that is representative of a new rotary position, among other options. Other examples are also possible.

Based on the data from the speed sensor, the tether control module 216 may determine a rotational speed of the motor 222 and/or the spool and responsively control the motor 222 (e.g., by increasing or decreasing an electrical current supplied to the motor 222) to cause the rotational speed of the motor 222 to match a desired speed. When adjusting the motor current, the magnitude of the current adjustment may be based on a proportional-integral-derivative (PID) calculation using the determined and desired speeds of the motor 222. For instance, the magnitude of the current adjustment may be based on a present difference, a past difference (based on accumulated error over time), and a future difference (based on current rates of change) between the determined and desired speeds of the spool.

In some embodiments, the tether control module 216 may vary the rate at which the tether 224 and payload 228 are lowered to the ground. For example, the speed controller may change the desired operating rate according to a variable deployment-rate profile and/or in response to other factors in order to change the rate at which the payload 228 descends toward the ground. To do so, the tether control module 216 may adjust an amount of braking or an amount of friction that is applied to the tether 224. For example, to vary the tether deployment rate, the UAV 200 may include friction pads that can apply a variable amount of pressure to the tether 224. As another example, the UAV 200 can include a motorized braking system that varies the rate at which the spool lets out the tether 224. Such a braking system may take the form of an electromechanical system in which the motor 222 operates to slow the rate at which the spool lets out the tether 224. Further, the motor 222 may vary the amount by which it adjusts the speed (e.g., the RPM) of the spool, and thus may vary the deployment rate of the tether 224. Other examples are also possible.

In some embodiments, the tether control module 216 may be configured to limit the motor current supplied to the motor 222 to a maximum value. With such a limit placed on the motor current, there may be situations where the motor 222 cannot operate at the desired operation specified by the speed controller. For instance, as discussed in more detail below, there may be situations where the speed controller specifies a desired operating rate at which the motor 222 should retract the tether 224 toward the UAV 200, but the motor current may be limited such that a large enough downward force on the tether 224 would counteract the retracting force of the motor 222 and cause the tether 224 to unwind instead. And as further discussed below, a limit on the motor current may be imposed and/or altered depending on an operational state of the UAV 200.

In some embodiments, the tether control module 216 may be configured to determine a status of the tether 224 and/or the payload 228 based on the amount of current supplied to the motor 222. For instance, if a downward force is applied to the tether 224 (e.g., if the payload 228 is attached to the tether 224 or if the tether 224 gets snagged on an object when retracting toward the UAV 200), the tether control module 216 may need to increase the motor current in order to cause the determined rotational speed of the motor 222 and/or spool to match the desired speed. Similarly, when the downward force is removed from the tether 224 (e.g., upon delivery of the payload 228 or removal of a tether snag), the tether control module 216 may need to decrease the motor current in order to cause the determined rotational speed of the motor 222 and/or spool to match the desired speed. As such, the tether control module 216 may be configured to monitor the current supplied to the motor 222. For instance, the tether control module 216 could determine the motor current based on sensor data received from a current sensor of the motor or a current sensor of the power system 220. In any case, based on the current supplied to the motor 222, determine if the payload 228 is attached to the tether 224, if someone or something is pulling on the tether 224, and/or if the payload retriever 226 is pressing against the UAV 200 after retracting the tether 224. Other examples are possible as well.

During delivery of the payload 228, the payload retriever 226 can be configured to secure the payload 228 while being lowered from the UAV by the tether 224, and can be further configured to release the payload 228 upon reaching ground level. The payload retriever 226 can then be retracted to the UAV by reeling in the tether 224 using the motor 222.

In some implementations, the payload 228 may be passively released once it is lowered to the ground. For example, a passive release mechanism may include one or more swing arms adapted to retract into and extend from a housing. An extended swing arm may form a hook on which the payload 228 may be attached. Upon lowering the release mechanism and the payload 228 to the ground via a tether, a gravitational force as well as a downward inertial force on the release mechanism may cause the payload 228 to detach from the hook allowing the release mechanism to be raised upwards toward the UAV. The release mechanism may further include a spring mechanism that biases the swing arm to retract into the housing when there are no other external forces on the swing arm. For instance, a spring may exert a force on the swing arm that pushes or pulls the swing arm toward the housing such that the swing arm retracts into the housing once the weight of the payload 228 no longer forces the swing arm to extend from the housing. Retracting the swing arm into the housing may reduce the likelihood of the release mechanism snagging the payload 228 or other nearby objects when raising the release mechanism toward the UAV upon delivery of the payload 228.

Active payload release mechanisms are also possible. For example, sensors such as a barometric pressure based altimeter and/or accelerometers may help to detect the position of the release mechanism (and the payload) relative to the ground. Data from the sensors can be communicated back to the UAV and/or a control system over a wireless link and used to help in determining when the release mechanism has reached ground level (e.g., by detecting a measurement with the accelerometer that is characteristic of ground impact). In other examples, the UAV may determine that the payload has reached the ground based on a weight sensor detecting a threshold low downward force on the tether and/or based on a threshold low measurement of power drawn by the winch when lowering the payload.

Other systems and techniques for delivering a payload, in addition or in the alternative to a tethered delivery system are also possible. For example, a UAV 200 could include an air-bag drop system or a parachute drop system. Alternatively, a UAV 200 carrying a payload could simply land on the ground at a delivery location. Other examples are also possible.

IV. ILLUSTRATIVE UAV DEPLOYMENT SYSTEMS

Figure 3:
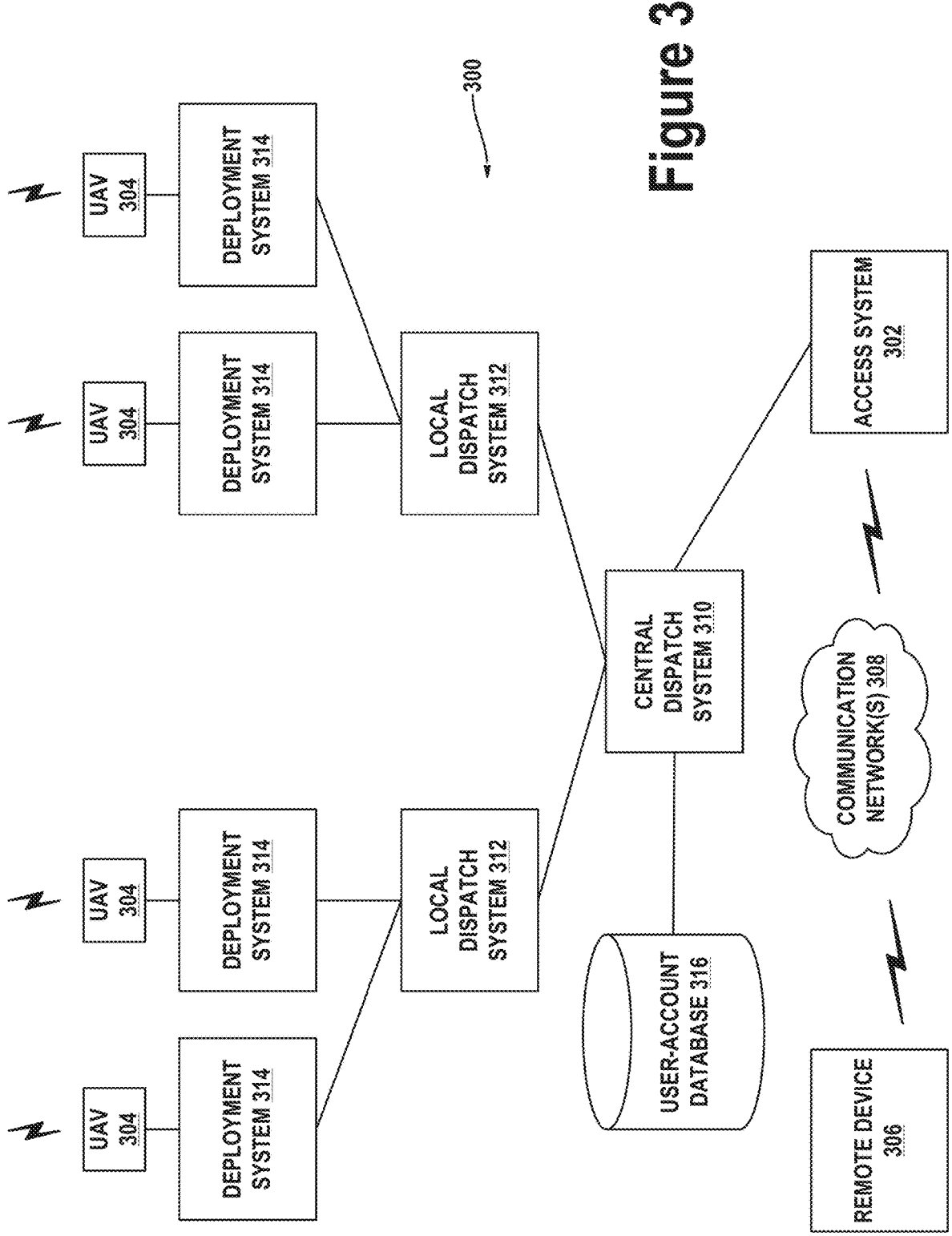
FIG. 3 is a simplified block diagram illustrating a UAV system, in accordance with example embodiments.

UAV systems may be implemented in order to provide various UAV-related services. In particular, UAVs may be provided at a number of different launch sites that may be in communication with regional and/or central control systems. Such a distributed UAV system may allow UAVs to be quickly deployed to provide services across a large geographic area (e.g., that is much larger than the flight range of any single UAV). For example, UAVs capable of carrying payloads may be distributed at a number of launch sites across a large geographic area (possibly even throughout an entire country, or even worldwide), in order to provide on-demand transport of various items to locations throughout the geographic area. FIG. 3 is a simplified block diagram illustrating a distributed UAV system 300, according to an example embodiment.

In the illustrative UAV system 300, an access system 302 may allow for interaction with, control of, and/or utilization of a network of UAVs 304. In some embodiments, an access system 302 may be a computing system that allows for human-controlled dispatch of UAVs 304. As such, the control system may include or otherwise provide a user interface through which a user can access and/or control the UAVs 304.

In some embodiments, dispatch of the UAVs 304 may additionally or alternatively be accomplished via one or more automated processes. For instance, the access system 302 may dispatch one of the UAVs 304 to transport a payload to a target location, and the UAV may autonomously navigate to the target location by utilizing various on-board sensors, such as a GPS receiver and/or other various navigational sensors.

Further, the access system 302 may provide for remote operation of a UAV. For instance, the access system 302 may allow an operator to control the flight of a UAV via its user interface. As a specific example, an operator may use the access system 302 to dispatch a UAV 304 to a target location. The UAV 304 may then autonomously navigate to the general area of the target location. At this point, the operator may use the access system 302 to take control of the UAV 304 and navigate the UAV to the target location (e.g., to a particular person to whom a payload is being transported). Other examples of remote operation of a UAV are also possible.

In an illustrative embodiment, the UAVs 304 may take various forms. For example, each of the UAVs 304 may be a UAV such as those illustrated in FIGS. 1A-1E. However, UAV system 300 may also utilize other types of UAVs without departing from the scope of the invention. In some implementations, all of the UAVs 304 may be of the same or a similar configuration. However, in other implementations, the UAVs 304 may include a number of different types of UAVs. For instance, the UAVs 304 may include a number of types of UAVs, with each type of UAV being configured for a different type or types of payload delivery capabilities.

The UAV system 300 may further include a remote device 306, which may take various forms. Generally, the remote device 306 may be any device through which a direct or indirect request to dispatch a UAV can be made. (Note that an indirect request may involve any communication that may be responded to by dispatching a UAV, such as requesting a package delivery). In an example embodiment, the remote device 306 may be a mobile phone, tablet computer, laptop computer, personal computer, or any network-connected computing device. Further, in some instances, the remote device 306 may not be a computing device. As an example, a standard telephone, which allows for communication via plain old telephone service (POTS), may serve as the remote device 306. Other types of remote devices are also possible.

Further, the remote device 306 may be configured to communicate with access system 302 via one or more types of communication network(s) 308. For example, the remote device 306 may communicate with the access system 302 (or a human operator of the access system 302) by communicating over a POTS network, a cellular network, and/or a data network such as the Internet. Other types of networks may also be utilized.

In some embodiments, the remote device 306 may be configured to allow a user to request delivery of one or more items to a desired location. For example, a user could request UAV delivery of a package to their home via their mobile phone, tablet, or laptop. As another example, a user could request dynamic delivery to wherever they are located at the time of delivery. To provide such dynamic delivery, the UAV system 300 may receive location information (e.g., UPS coordinates, etc.) from the user's mobile phone, or any other device on the user's person, such that a UAV can navigate to the user's location (as indicated by their mobile phone).

In an illustrative arrangement, the central dispatch system 310 may be a server or group of servers, which is configured to receive dispatch messages requests and/or dispatch instructions from the access system 302. Such dispatch messages may request or instruct the central dispatch system 310 to coordinate the deployment of UAVs to various target locations. The central dispatch system 310 may be further configured to route such requests or instructions to one or more local dispatch systems 312. To provide such functionality, the central dispatch system 310 may communicate with the access system 302 via a data network, such as the Internet or a private network that is established for communications between access systems and automated dispatch systems.

In the illustrated configuration, the central dispatch system 310 may be configured to coordinate the dispatch of UAVs 304 from a number of different local dispatch systems 312. As such, the central dispatch system 310 may keep track of which UAVs 304 are located at which local dispatch systems 312, which UAVs 304 are currently available for deployment, and/or which services or operations each of the UAVs 304 is configured for (in the event that a UAV fleet includes multiple types of UAVs configured for different services and/or operations). Additionally or alternatively, each local dispatch system 312 may be configured to track which of its associated UAVs 304 are currently available for deployment and/or are currently in the midst of item transport.

In some cases, when the central dispatch system 310 receives a request for UAV-related service (e.g., transport of an item) from the access system 302, the central dispatch system 310 may select a specific UAV 304 to dispatch. The central dispatch system 310 may accordingly instruct the local dispatch system 312 that is associated with the selected UAV to dispatch the selected UAV. The local dispatch system 312 may then operate its associated deployment system 314 to launch the selected UAV. In other cases, the central dispatch system 310 may forward a request for a UAV-related service to a local dispatch system 312 that is near the location where the support is requested and leave the selection of a particular UAV 304 to the local dispatch system 312.

In an example configuration, the local dispatch system 312 may be implemented as a computing system at the same location as the deployment system(s) 314 that it controls. For example, the local dispatch system 312 may be implemented by a computing system installed at a building, such as a warehouse, where the deployment system(s) 314 and UAV(s) 304 that are associated with the particular local dispatch system 312 are also located. In other embodiments, the local dispatch system 312 may be implemented at a location that is remote to its associated deployment system(s) 314 and UAV(s) 304.

Numerous variations on and alternatives to the illustrated configuration of the UAV system 300 are possible. For example, in some embodiments, a user of the remote device 306 could request delivery of a package directly from the central dispatch system 310. To do so, an application may be implemented on the remote device 306 that allows the user to provide information regarding a requested delivery, and generate and send a data message to request that the UAV system 300 provide the delivery. In such an embodiment, the central dispatch system 310 may include automated functionality to handle requests that are generated by such an application, evaluate such requests, and, if appropriate, coordinate with an appropriate local dispatch system 312 to deploy a UAV.

Further, some or all of the functionality that is attributed herein to the central dispatch system 310, the local dispatch system(s) 312 the access system 302, and/or the deployment system(s) 314 may be combined in a single system, implemented in a more complex system, and/or redistributed among the central dispatch system 310, the local dispatch system(s) 312, the access system 302, and/or the deployment system(s) 314 in various ways.

Yet further, while each local dispatch system 312 is shown as having two associated deployment systems 314, a given local dispatch system 312 may alternatively have more or fewer associated deployment systems 314. Similarly, while the central dispatch system 310 is shown as being in communication with two local dispatch systems 312, the central dispatch system 310 may alternatively be in communication with more or fewer local dispatch systems 312.

In a further aspect, the deployment systems 314 may take various forms. In general, the deployment systems 314 may take the form of or include systems for physically launching one or more of the UAVs 304. Such launch systems may include features that provide for an automated UAV launch and/or features that allow for a human-assisted UAV launch. Further, the deployment systems 314 may each be configured to launch one particular UAV 304, or to launch multiple UAVs 304.

The deployment systems 314 may further be configured to provide additional functions, including for example, diagnostic-related functions such as verifying system functionality of the UAV, verifying functionality of devices that are housed within a UAV (e.g., a payload delivery apparatus), and/or maintaining devices or other items that are housed in the UAV (e.g., by monitoring a status of a payload such as its temperature, weight, etc.).

In some embodiments, the deployment systems 314 and their corresponding UAVs 304 (and possibly associated local dispatch systems 312) may be strategically distributed throughout an area such as a city. For example, the deployment systems 314 may be strategically distributed such that each deployment system 314 is proximate to one or more payload pickup locations (e.g., near a restaurant, store, or warehouse). However, the deployment systems 314 (and possibly the local dispatch systems 312) may be distributed in other ways, depending upon the particular implementation. As an additional example, kiosks that allow users to transport packages via UAVs may be installed in various locations. Such kiosks may include UAV launch systems, and may al low a user to provide their package for loading onto a UAV and pay for UAV shipping services, among other possibilities. Other examples are also possible.

In a further aspect, the UAV system 300 may include or have access to a user-account database 316. The user-account database 316 may include data for a number of user accounts, and which are each associated with one or more persons. For a given user account, the user-account database 316 may include data related to or useful in providing UAV-related services. Typically, the user data associated with each user account is optionally provided by an associated user and/or is collected with the associated user's permission.

Further, in some embodiments, a person may be required to register for a user account with the UAV system 300, if they wish to be provided with UAV-related services by the UAVs 304 from UAV system 300. As such, the user-account database 316 may include authorization information for a given user account (e.g., a username and password), and/or other information that may be used to authorize access to a user account.

In some embodiments, a person may associate one or more of their devices with their user account, such that they can access the services of UAV system 300. For example, when a person uses an associated mobile phone, e.g., to place a call to an operator of the access system 302 or send a message requesting a UAV-related service to a dispatch system, the phone may be identified via a unique device identification number, and the call or message may then be attributed to the associated user account. Other examples are also possible.

V. EXAMPLE SYSTEMS AND METHODS FOR BACKEND AUTOMATION SYSTEM

Figure 4:
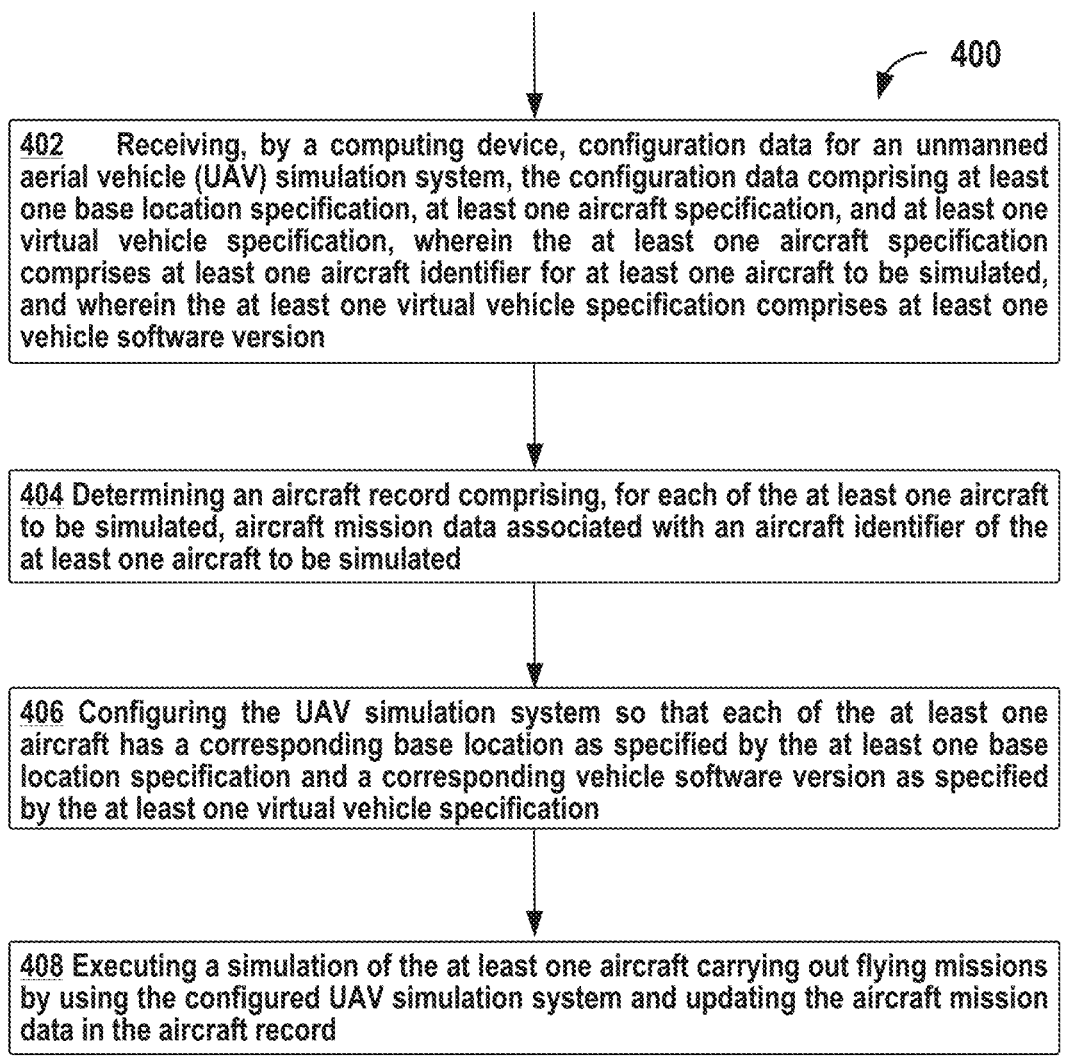
FIG. 4 is a block diagram of a method, in accordance with example embodiments.

FIG. 4 is a block diagram of method 400, in accordance with example embodiments. In some examples, method 400 may be carried out by a control system for a fleet of UAVs. In further examples, method 400 may be carried out by one or more processors, executing program instructions stored in a data storage. In further examples, some or all of the blocks of method 400 may be performed by a control system remote from the UAVs. In yet further examples, different blocks of method 400 may be performed by different control systems, located on and/or remote from a UAV. Method 400 may facilitate modeling the behavior of one or more UAVs, such as the UAV illustrated and described with respect to FIGS. 1-2.

Method 400 may be carried out in the context of a backend automation system. In particular, a computing system carrying out method 400 may communicate with a backend automation system to configure and/or execute a backend simulation system using base location specifications, aircraft specifications, and/or virtual vehicle specifications indicated from configuration data.

Figure 5:
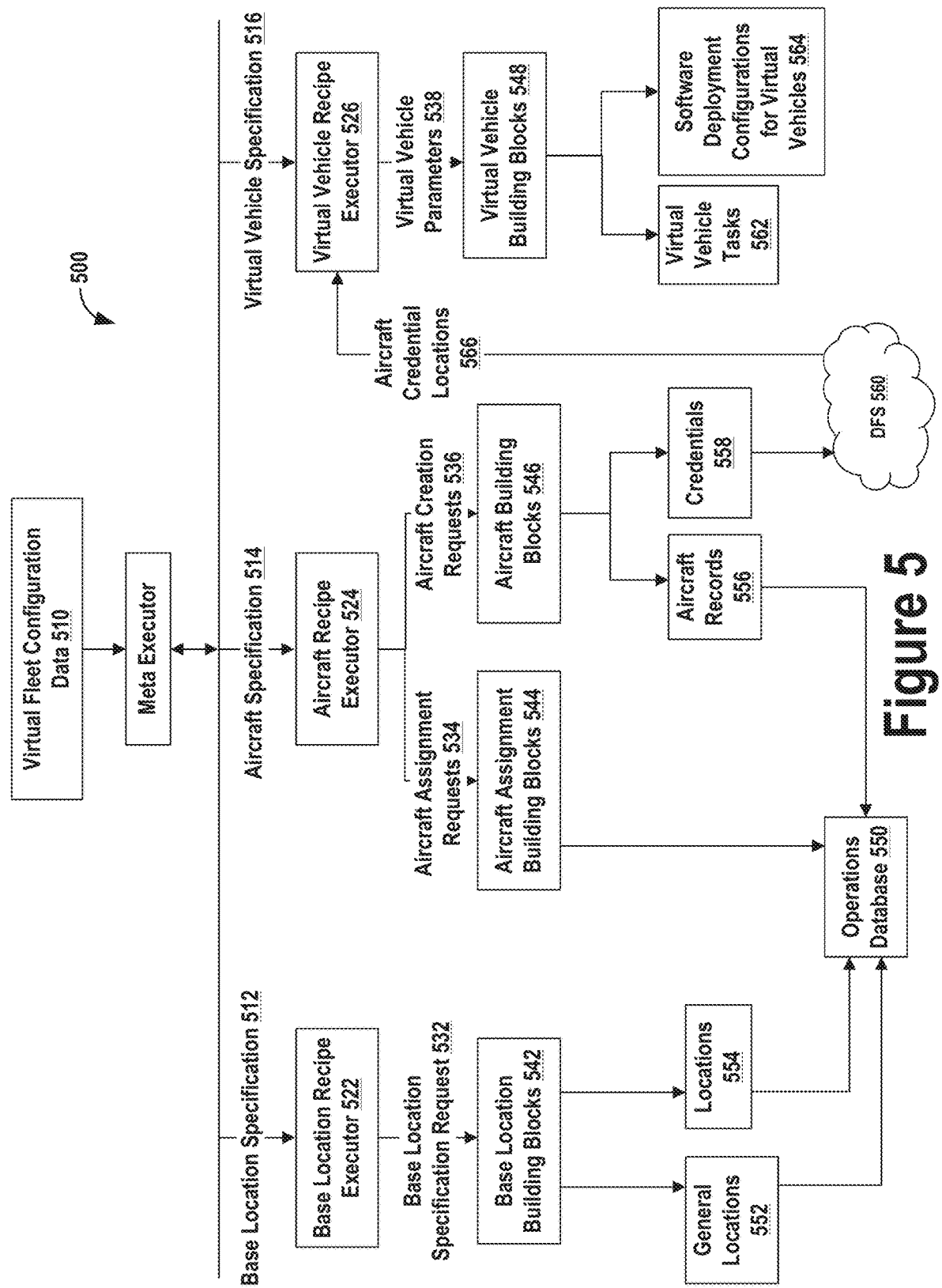
FIG. 5 is a block diagram of a backend automation system, in accordance with example embodiments.
Figure 9:
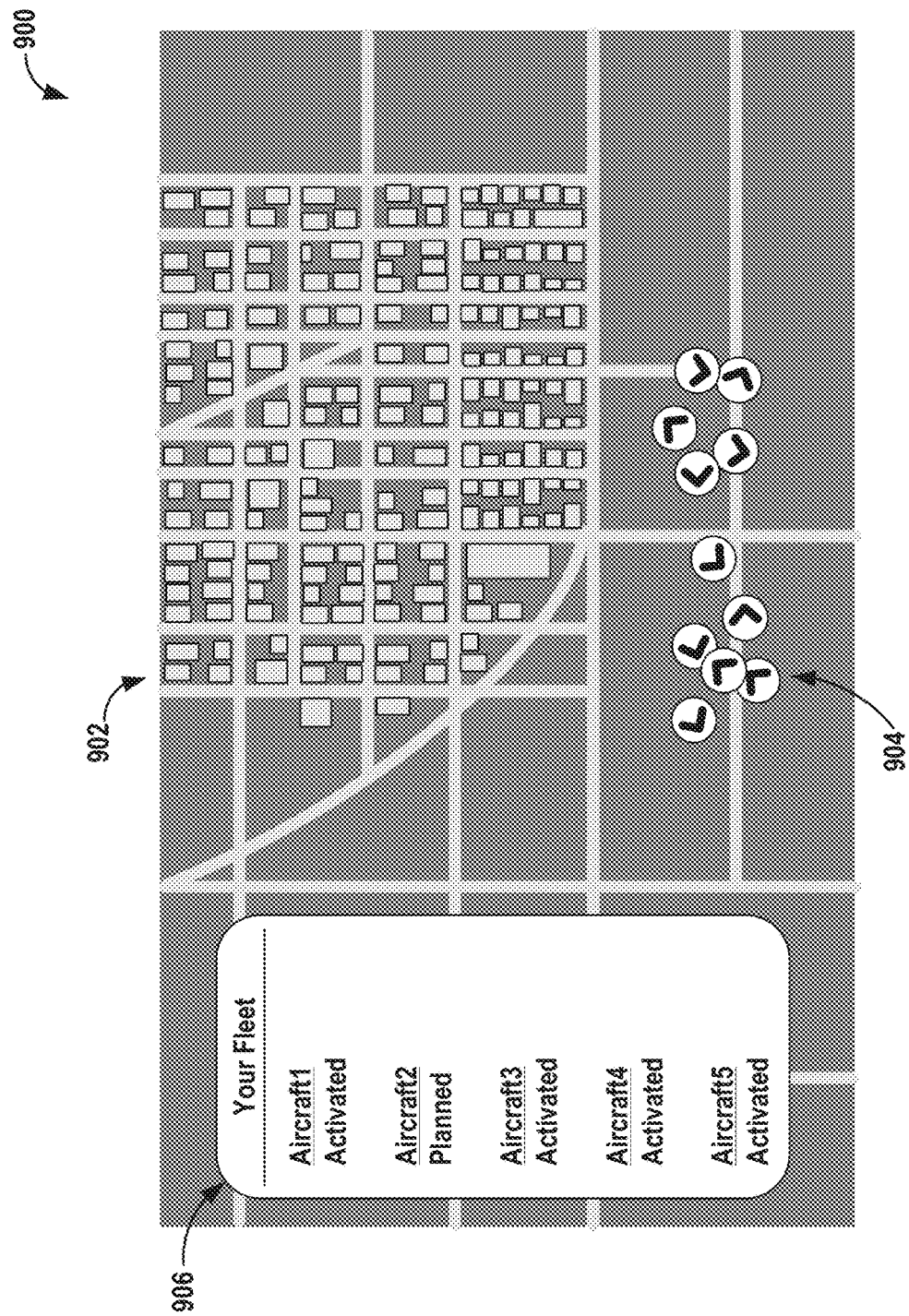
FIG. 9 illustrates an aircraft simulation, in accordance with example embodiments.

Part or all of method 400 may be executed using one or more components of virtual fleet configuration tooling architecture 500, illustrated in FIG. 5. Virtual fleet configuration tooling architecture 500 may facilitate taking an input (e.g., virtual fleet configuration data 510) and communicating with a backend to configure a simulation with the specified base location specification(s) 512, aircraft specification(s) 514, and virtual vehicle specification(s) 516. Base location recipe executor 522, aircraft recipe executor 524, and virtual vehicle recipe executor 526 may each parse out the request and may determine what needs to be built/configured by the backend systems.

For example, a computing system executing base location recipe executor 522 may determine base location request 532 based on base location specification 512. Likewise, a computing system executing aircraft recipe executor 524 may determine aircraft assignment requests 534 based on aircraft specification 514, and a computing system executing virtual vehicle recipe executor 526 may determine virtual vehicle parameters 538 based on virtual vehicle recipe specification 516.

The computing system may feed requests into building blocks, which may communicate with the backend systems to configure the simulation. For example, the computing system may use base location building blocks 542 to configure the simulation based on base location request 532. In particular, base location request 532 may indicate one or more general locations 552 and/or one or more locations 554. Each of one or more general locations 552 fray include one or more locations. For example, a general location may be a neighborhood, whereas one or more locations may include locations of yards of houses within that neighborhood.

The computing system may also use aircraft assignment requests 534 to determine what to execute in aircraft assignment building blocks 544, and the computing system may use aircraft creation requests 536 to determine and/or construct aircraft records 556 and credentials 558 based on the output of aircraft building blocks 546. The computing system may enter general locations 552, locations 554, aircraft assignment building blocks 544, and aircraft records 556 into operations database 550.

The computing system may store credentials 558 in Distributed Filesystem (DFS) 560. From DFS 560, the computing system may retrieve aircraft credential locations 566. Based on aircraft credential locations 566 and virtual vehicle specification 516, virtual vehicle recipe executor 526 may determine virtual vehicle parameters 538. And based on virtual vehicle parameters 538, the computing system may determine virtual vehicle tasks 562 and software deployment configurations for virtual vehicles 564 using virtual vehicle building blocks 548.

Referring back to FIG. 4, at block 402, method 400 includes receiving, by a computing system, configuration data for an unmanned aerial vehicle (UAV) simulation system, the configuration data comprising at least one base location specification, at least one aircraft specification, and at least one virtual vehicle specification, where the at least one aerial vehicle specification comprises at least one aircraft identifier for at least one aircraft to be simulated, and where the at least one virtual vehicle specification comprises at least one virtual software version.

The configuration data may include information on the environment to be simulated, the aircraft to be simulated, the behavior of the aircraft to be simulated, and other simulation instructions. For example, the base location specification may include one or more locations for various aircrafts. Additionally and/or alternatively, the base location specification may also include one or more general areas that include one or more locations, such that each location may be associated with an aircraft. In some examples, locations specified by the base location specification may correspond with physical locations in the environment from where an aircraft may actually takeoff. The aircraft specification may include one or more aircraft identifiers for the one or more aircrafts that are to be simulated. The aircraft identifiers may correspond to physical aircrafts that may be operating in the environment and/or a location or area specified by the base location specification. Further, the configuration data may include a virtual vehicle specification, which may specify aircraft behavior for one or more aircrafts to be simulated. For example, the virtual vehicle specification may include how the aircraft may respond to various wind speeds, environment conditions, obstacles in the environment, among other examples. Other examples of base location specifications, aircraft specifications, and virtual vehicle specifications are also possible.

Separating the aircraft specification and virtual vehicle specification in this manner may facilitate more efficient comparisons among aircraft configurations, different versions of simulated aircraft behavior, among others. For example, the virtual vehicle specification may specify a version of a physics simulator that specifies aircraft behavior for one or more of the aircrafts to be simulated. The user may specify different versions of this physics simulator for various simulations and the computing system may execute these simulations. The user may compare the results from these simulations to determine how the aircraft may react to various scenarios in the environment. With the virtual vehicle specification separate from the aircraft specification and the backend automation system, the user may easily set up simulations with a minimal set of specifications and compare the simulation results from simulations run with various configurations.

In some examples, the configuration data may be determined based on one or more default settings. The computing device may receive a minimal input, such as an input indicating a base location specification of an area in the environment from where one or more aircrafts may take off. For example, the computing system may receive an indication for generating twenty aircrafts in the proximity of a distribution facility. The computing device may then generate specific locations from which each aircraft may take off, determine aircraft specifications, and generate virtual vehicle specifications based on one or more default settings. In particular, default settings may indicate a default distribution of takeoff locations for the specified base location specification, a default version for each aircraft in the aircraft specifications, a default vehicle version, among other examples. The computing device may generate the aircraft specification based on default settings specifying aircraft versions, and the computing device may generate the virtual vehicle specifications based on settings specifying default vehicle versions. Other examples are also possible.

In some examples, the computing system may receive a minimal input, perhaps including a base location quantity and an aircraft quantity, and the computing system may determine the configuration data based on this minimal input. For example, the computing system may receive an indication of a general area from which the aircrafts may take off and an indication of how many aircrafts are to be in the simulation. As another example, the computing system may receive an indication to generate an aircraft in every fast food location in a particular city.

After receiving these indications, the computing system may determine the configuration data by randomly generating a number of takeoff locations within the general area as specified by the indication of the general area from which the aircrafts may take off and the indication of how many aircrafts are to be in the simulation. The computing system may also determine aircraft specifications corresponding to the specified quantity of aircrafts, perhaps using one or more default aircraft specifications. In addition, the computing system may determine virtual vehicle specifications for the aircrafts, perhaps using one or more default virtual vehicle specifications. Variations on what the computing system receives, the default settings, among others may also be possible.

In some examples, a user may specify the configuration data using a graphical user interface. The graphical user interface may include a map and one or more interactive elements that the user may use to specify the configuration data. For example, the user may use an interactive element to add one or more aircrafts to a location on the map, and the user may use another interactive element to specify an aircraft identifier for each aircraft. The user may also specify the vehicle software version using one or more interactive elements. The computing system may determine the configuration data from the graphical user interface by generating base location specifications for each aircraft that the user indicated and by generating aircraft specifications and virtual vehicle specifications based on user specifications.

Further, the computing system may extrapolate configuration data based on input data. For example, the computing system may receive input data indicating a base location specification, and the computing system may determine base location specifications based on the inputted base location specification. The inputted base location specification may indicate an area in the environment from which the simulated aircrafts should take off, and the computing device may generate an appropriate number of base locations, where the number of base locations to be generated may be specified by the base location specification and/or aircraft specifications.

In some examples, one or more inputted base location specifications may each indicate a physical area in the environment in which the simulation may be run. The computing system may then execute the simulation of the aircraft as carrying out missions within a location with the characteristics of the physical environment. For example, the physical environment may have buildings above a particular height and arranged in a certain way. While carrying out the simulations of the aircrafts in that physical environment, the computing device may thus avoid the buildings that are above the particular height based on the location and arrangement of the buildings.

As mentioned, the computing system may generate aircrafts based on the number of base locations and/or a number of aircrafts specified by the aircraft specification. The aircraft specification may also include a vehicle software version. To generate an aircraft for each base location specification and/or to generate the number of aircrafts specified, the computing system may set each generated aircraft as having the same vehicle software version, perhaps as specified by the aircraft specification.

In some examples, the computing system may receive, as part of the configuration data, environmental details specifying environment characteristics. For example, the environmental characteristic may be that the ambient environment is a particular temperature or that the drift rate is a certain speed in a certain direction. These environmental characteristics may affect the behavior of the aircraft during the simulation.

In some examples, the configuration data may further comprise a file path to aircraft mission data. This aircraft record may be stored on the same computing system or a different computing system, and the file path may indicate a location on the computing system or on a different computing system.

Referring back to FIG. 4, at block 404, method 400 includes determining an aircraft record comprising, for each of the at least one aircraft to be simulated, aircraft mission data associated with an aircraft identifier of the at least one aircraft to be simulated.

FIG. 6 illustrates aircraft records 600, 602, 604, 606, and 608, in accordance with example embodiments. Each of aircraft records 600, 602, 604, 606, 608 may include an aircraft identifier, a mission, a state, mission data for each of the aircrafts and/or one or more other fields. Each of aircraft records 600, 602, 604, 606, 608 may include fields that are automatically filled as the backend system is configured and/or fields that are filled as the simulation is running.

As part of the backend automation system, the computing system may determine the aircraft record based on the configuration request. The computing system may generate aircraft records for each aircraft in the aircraft specification, and the computing system may record and/or generate the data in the aircraft record (e.g., the aircraft ID as well as other relevant information).

In some examples, the computing system may determine various information based on the configuration data and the computing system may store that information in the aircraft record. For example, the computing system may determine which missions are to be assigned to each aircraft, perhaps based on distance to the mission destination, items to be delivered, storage capacity of the aircrafts, etc., and the computing system may store the mission assignments in aircraft records 600, 602, 604, 606, and/or 608. As another example, the computing system may assign base locations to each aircraft, and the computing system may store the base locations in aircraft records 600, 602, 604, 606, and/or 608.

Referring back to FIG. 4, at block 406, method 400 includes configuring the UAV simulation system so that each of the at least one aircraft has a corresponding base location as specified by the at least one base location specification and a corresponding vehicle software version as specified by the at least one virtual vehicle specification. As mentioned above, configuring the UAV simulation system so that each of the at least one aircraft has a corresponding base location as specified by the at least one base location specification may involve storing the base location in the aircraft record.

In some examples, the computing system may use the base locations of the aircraft to assign missions. For example, aircraft missions may have associated destination locations, and the computing system may assign the aircraft to a mission with a destination location closest to the base location of the aircraft. The computing system may also base aircraft mission assignments based on a variety of other factors, including for example, the environment of the aircraft, obstacles in the environment, among other factors.

In some examples, configuring the UAV simulation system so that each of the at least one aircraft has a corresponding base location and a corresponding vehicle software version may also involve one or more operations involving a command line interface. For example, FIG. 7 is a block diagram illustrating software code for configuring a backend simulation system, in accordance with example embodiments. Configuring the backend simulation system may involve configuration protocol buffer 702 and generated configuration 704. In some examples, the computing device may then determine generated configuration 704 based on configuration protocol buffer 702.

Configuration protocol buffer 702 may be generated by the computing system and/or user specified. For example, the computing system may receive user input specifying that the simulation should include three base locations, three repeated aircrafts, and the aircrafts should have a virtual vehicle version of "4". Based on these user inputs, the computing system may determine configuration protocol buffer 702. A user may specify configuration protocol buffer 702 and send the configuration protocol buffer 702 to the computing device to determine configuration 704

In some examples, the computing system may determine configuration protocol buffer 702 based on user inputs. For example, a user may use a graphical user interface to indicate how many base locations and/or aircrafts are desired, and the computing system may generate configuration protocol buffer 702 based on the user input. In some examples, the graphical user interface may include a map, and the user may indicate base locations and/or aircrafts, and the computing system may generate a kml file based on the map. Based on the kml file, the computing system may determine configuration protocol buffer 702.

The computing system may determine configuration 704 based on configuration protocol buffer 702. In some examples, configuration protocol buffer 702 may include an indication of the type of aircrafts, types of base locations, and/or types of virtual vehicles to create. The computing system may then determine various parameters, including the aircraft ids, configuration protocols, and other information based on the specified information. For example, configuration protocol buffer 702 may include a field that states "wing.simulation.ModelConfig, config=3," and the computing system may generate environmental characteristics, including, for example, "sl_temperature_today_c: 25.0" and "baro_drift_rate_pa_per_minute: 0.0", Similar examples may apply to aircrafts and base locations.

Generated configuration 704 may include aircraft identifiers, environment characteristics, among other examples. In particular, generated configuration 704 may have aircraft identifiers for each aircraft, the aircraft type and base location (e.g., longitude and latitude), aircraft record location, among other examples.

As mentioned above, by configuring the backend simulation system as outlined in the configuration request, the computing system may be able to create a large number of aircrafts under various configurations without having the user specify the location of each aircraft individually. Configuring the backend simulation system in this manner may also enable the computing device to monitor the performance of fleets, simulate fleet failures, simulate air traffic, among other examples at scale with many aircrafts in various configurations.

Prior to executing the simulation, the computing system may verify that the user specified inputs are sufficient to run a simulation, e.g., that the configuration data includes one or more required elements needed to execute the simulation. Required elements needed to execute the simulation may include various components, including specifying a quantity of base locations or specifying a quantity of aircrafts, specifying a virtual vehicle specification, specifying a version of the environment to use, and/or other configuration data elements. For example, if the user does not specify a quantity of base locations and/or a quantity of aircrafts, the computing system may determine that the configuration data does not include one or more required elements needed to execute the simulation. In contrast, if the user does specify all the required elements, the computing system may then continue to configuring the UAV simulation system and executing the simulation.

Referring back to FIG. 4, at block 408, method 400 includes executing a simulation of the at least one aircraft carrying out flying missions by using the configured UAV simulation system and updating the aircraft mission data in the aircraft record. For example, the computing system may update aircraft record 600 of FIG. 6 as part of the aircraft mission data.

FIG. 8 illustrates updated aircraft record 800, in accordance with example embodiments. Updated aircraft record 800 may include updated mission data for each aircraft that the computing system simulates. For example, for Aircraft1, the computing system may run a simulation of using the aircraft to deliver an item to house 1. During the simulation, the computing system may record one or more locations of the aircraft (e.g., "Location at 60s: (1.6, 0.7) . . . "). The computing system may also record other information, e.g., whether the aircraft was successful in its mission, whether the landing point in the destination was adjusted, environment conditions, any errors encountered during the aircraft's mission, among other examples.

The computing device may also display the executing simulation. For example, display 900 may be of map 902 of aircrafts 904 being simulated. Display 900 may also have other graphical elements, including panel 906 depicting the statuses of each aircraft. In some examples, map 902 may be of an environment/location in which a physical aircraft may operate. The computing system may update display 900 as the simulation is being executed.

The computing system may execute the simulation and display results in other ways. For example, in addition to or as an alternative to the display, the computing system may output results on a command line interface. Additionally and/or alternatively, the computing system may output the results in one or more files, e.g., aircraft record 800, which a user or the computing system may later access to analyze the results.

In some examples, receiving the configuration data for the UAV simulation may include receiving user input on a graphical user interface. The graphical user interface may include a map and one or more interactive elements to specify the at least one base location specification, the at least one aircraft specification, or the at least one virtual vehicle specification. Receiving the configuration data for the UAV simulation may also include determining, based on the user input on the graphical user interface, the configuration data.

In some examples, receiving the configuration data may include receiving input data specifying at least one base location and determining, based on the at least one base location and one or more default settings, the at least one aircraft specification and the at least one virtual vehicle specification.

In some examples, method 400 may include receiving a configuration file specifying a base location quantity and an aircraft quantity. Method 400 may also include determining the configuration data based on the base location quantity and the aircraft quantity and transmitting the configuration data to the computing device.

In some examples, the configuration file may further specify a backend services field associated with a virtual vehicle specification.

In some examples, configuring the UAV simulation system comprises determining one or more base locations based on the at least one base location specification, and configuring the UAV simulation system so that each of the at least one aircraft has a corresponding base location as specified by the one or more base locations.

In some examples, the at least one virtual vehicle specification specifies aircraft behavior for each of the at least one aircrafts to be simulated.

In some examples, the aircraft record further comprises a state of the aircraft.

In some examples, the base location specification further comprises one or more missions for the at least one aircraft to carry out, where method 400 further comprises configuring the UAV simulation system so that each of the one or more missions is assigned to an aircraft of the at least one aircraft.

In some examples, method 400 further includes verifying that the configuration data comprises one or more required elements to execute the simulation, where configuring the simulation is in response to the verifying.

In some examples, the one or more required elements to execute the simulation comprises a base location specification and a virtual vehicle specification.

In some examples, the aircraft identifier is associated with a physical aircraft.

In some examples, the at least one base location specification specifies a location in a physical environment, where executing the simulation comprises executing the simulation of the at least one aircraft carrying out the flying missions in a location with characteristics of the location in the physical environment.

In some examples, method 400 further includes receiving input specifying a desired simulation output, where executing the simulation further includes determining, based on the aircraft record and the desired simulation output, simulation results and causing display of the simulation results.

In some examples, each of the at least one aircraft to be simulated is associated with the same vehicle software version.

In some examples, the configuration data further comprises a file path to the aircraft mission data.

In some examples, the configuration data further comprises one or more configuration details specifying environment characteristics.

In some examples, the aircraft record comprises one or more aircraft record files, where each aircraft record file is associated with an aircraft of the at least one aircraft.

VI. CONCLUSION

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above-detailed description describes various features and functions of the disclosed systems, devices, and methods with reference to the accompanying figures. In the figures, similar symbols typically identify similar components unless context dictates otherwise. The example embodiments described herein and in the figures are not meant to be limiting. Other embodiments can be utilized, and other changes can be made without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

A block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code or related data may be stored on any type of computer-readable medium such as a storage device including a disk or hard drive or other storage medium.

The computer-readable medium may also include non-transitory computer-readable media such as computer-readable media that stores data for short periods of time like register memory, processor cache, and random access memory (RAM). The computer-readable media may also include non-transitory computer-readable media that stores program code or data for longer periods of time, such as secondary or persistent long-term storage, like read-only memory (ROM), optical or magnetic disks, compact-disc read-only memory (CD-ROM), for example. The computer-readable media may also be any other volatile or non-volatile storage systems. A computer-readable medium may be considered a computer-readable storage medium, for example, or a tangible storage device.

Moreover, a block that represents one or more information transmissions may correspond to information transmissions between software or hardware modules in the same physical device. However, other information transmissions may be between software modules or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A method comprising:
providing a virtual fleet configuration tooling architecture for receiving user input of configuration data for an unmanned aerial vehicle (UAV) simulation system, wherein the virtual fleet configuration tooling architecture enables separate user input of at least one virtual vehicle specification, at least one aircraft specification, and at least one base location specification;

receiving, by a computing device, the user input, entered into the virtual fleet configuration tooling architecture, of the configuration data for the UAV simulation system, the configuration data indicating the at least one base location specification, the at least one aircraft specification, and the at least one virtual vehicle specification, wherein the at least one aircraft specification comprises at least one aircraft identifier for at least one aircraft to be simulated, wherein the at least one virtual vehicle specification comprises at least one vehicle software version, and wherein the at least one software version is selected by a user from a plurality of available software versions;

determining an aircraft record comprising, for each of the at least one aircraft to be simulated, aircraft mission data associated with an aircraft identifier of the at least one aircraft to be simulated;

configuring the UAV simulation system based on user input provided via the virtual fleet configuration tooling architecture;

based on the configuring, associating each of the at least one aircraft with a corresponding base location as specified by the at least one base location specification and a corresponding vehicle software version as specified by the at least one virtual vehicle specification; and executing a simulation of the at least one aircraft carrying out flying missions by using the configured UAV simulation system and updating the aircraft mission data in the aircraft record.

2. The method of claim 1, wherein receiving the configuration data for the UAV simulation system comprises:
receiving user input on a graphical user interface, wherein the graphical user interface comprises a map and one or more interactive elements to specify the at least one base location specification, the at least one aircraft specification, or the at least one virtual vehicle specification; and
determining, based on the user input on the graphical user interface, the configuration data.

3. The method of claim 1, further comprising:
receiving a configuration file specifying a base location quantity and an aircraft quantity,
wherein the configuring is further based on the base location quantity and the aircraft quantity.

4. The method of claim 1, wherein configuring the UAV simulation system comprises:
determining one or more base locations based on the at least one base location specification.

5. The method of claim 1, wherein the at least one virtual vehicle specification specifies aircraft behavior for each of the at least one aircraft to be simulated.

6. The method of claim 1, wherein the base location specification further comprises one or more missions for the at least one aircraft to carry out, wherein the method further comprises:
based on the configuring, associating each of the one or more missions with an aircraft of the at least one aircraft.

7. The method of claim 1, further comprising:
verifying that the configuration data comprises one or more required elements to execute the simulation, wherein configuring the UAV simulation system is in response to the verifying.

8. The method of claim 7, wherein the one or more required elements to execute the simulation comprises a base location specification and a virtual vehicle specification.

9. The method of claim 1, wherein the aircraft identifier is associated with a physical aircraft.

10. The method of claim 1, wherein the aircraft record further comprises a state of the aircraft.

11. The method of claim 1, wherein the at least one base location specification specifies a location in a physical environment, wherein executing the simulation comprises executing the simulation of the at least one aircraft carrying out the flying missions in a location with characteristics of the location in the physical environment.

12. The method of claim 1, further comprising:
receiving input specifying a desired simulation output, wherein executing the simulation further comprises determining, based on the aircraft record and the desired simulation output, simulation results; and
causing display of the simulation results.

13. The method of claim 1, wherein each of the at least one aircraft to be simulated is associated with the same vehicle software version.

14. The method of claim 1, wherein the configuration data further comprises a file path to the aircraft mission data.

15. The method of claim 1, wherein the configuration data further comprises one or more configuration details specifying environment characteristics.

16. The method of claim 1, wherein the aircraft record comprises one or more aircraft record files, wherein each aircraft record file is associated with an aircraft of the at least one aircraft.

17. A computing device configured to:
provide a virtual fleet configuration tooling architecture for receiving user input of configuration data for an unmanned aerial vehicle (UAV) simulation system, wherein the virtual fleet configuration tooling architecture enables separate user input of at least one virtual vehicle specification, at least one aircraft specification, and at least one base location specification;
receive, via user input into the virtual fleet configuration tooling architecture, the configuration data for the UAV simulation system, the configuration data specifying the at least one base location specification, the at least one aircraft specification, and the at least one virtual vehicle specification, wherein the at least one aircraft specification comprises at least one aircraft identifier for at least one aircraft to be simulated, wherein the at least one virtual vehicle specification comprises at least one vehicle software version, and wherein the at least one software version is selected by a user from a plurality of available software versions;
determine an aircraft record comprising, for each of the at least one aircraft to be simulated, aircraft mission data associated with an aircraft identifier of the at least one aircraft to be simulated;
configure the UAV simulation system based on user input provided via the virtual fleet configuration tooling architecture;
based on the configuring, associate each of the at least one aircraft with a corresponding base location as specified by the at least one base location specification and a corresponding vehicle software version as specified by the at least one virtual vehicle specification; and
execute a simulation of the at least one aircraft carrying out flying missions by using the configured UAV simulation system and updating the aircraft mission data in the aircraft record.

18. A non-transitory computer readable medium comprising program instructions executable by one or more processors to perform operations, the operations comprising:
providing a virtual fleet configuration tooling architecture for receiving user input of configuration data for an unmanned aerial vehicle (UAV) simulation system, wherein the virtual fleet configuration tooling architecture enables separate user input of at least one virtual vehicle specification, at least one aircraft specification, and at least one base location specification;
receiving the user input, entered into the virtual fleet configuration tooling architecture, of the configuration data for the UAV simulation system, the configuration data specifying the at least one base location specification, the at least one aircraft specification, and the at least one virtual vehicle specification, wherein the at least one aircraft specification comprises at least one aircraft identifier for at least one aircraft to be simulated, wherein the at least one virtual vehicle specification comprises at least one vehicle software version, and wherein the at least one software version is selected by a user from a plurality of available software versions;
determining an aircraft record comprising, for each of the at least one aircraft to be simulated, aircraft mission data associated with an aircraft identifier of the at least one aircraft to be simulated;
configuring the UAV simulation system based on user input provided via the virtual fleet configuration tooling architecture;
based on the configuring, associating each of the at least one aircraft with a corresponding base location as specified by the at least one base location specification and a corresponding vehicle software version as specified by the at least one virtual vehicle specification; and
executing a simulation of the at least one aircraft carrying out flying missions by using the configured UAV simulation system and updating the aircraft mission data in the aircraft record.

* * * * *